(12) United States Patent
Webb

(10) Patent No.: US 9,183,120 B1
(45) Date of Patent: Nov. 10, 2015

(54) FUNCTIONAL DEPENDENCY ANALYSIS

(71) Applicant: The MathWorks, Inc., Natick, MA (US)

(72) Inventor: Peter Webb, Newton, MA (US)

(73) Assignee: The MathWorks, Inc., Natick, MA (US)

( * ) Notice: Subject to any disclaimer, the term of this patent is extended or adjusted under 35 U.S.C. 154(b) by 214 days.

(21) Appl. No.: 13/910,104

(22) Filed: Jun. 4, 2013

(51) Int. Cl.
  G06F 12/00 (2006.01)
  G06F 12/02 (2006.01)
  G06F 9/44 (2006.01)
  G06F 9/445 (2006.01)
  G06F 9/46 (2006.01)
  G06F 11/36 (2006.01)

(52) U.S. Cl.
  CPC .................................. G06F 11/3668 (2013.01)

(58) Field of Classification Search
  CPC .............. G06F 8/20; G06F 8/34; G06F 8/61; G06F 8/65; G06F 8/71; G06F 8/433; G06F 8/4442; G06F 11/3608; G06F 9/5061; G06F 11/008
  See application file for complete search history.

(56) References Cited

U.S. PATENT DOCUMENTS

| | | | | |
|---|---|---|---|---|
| 4,558,413 A | * | 12/1985 | Schmidt et al. | 717/170 |
| 6,725,452 B1 | * | 4/2004 | Te'eni et al. | 717/168 |
| 7,483,970 B2 | * | 1/2009 | Anuszczyk et al. | 717/104 |
| 7,802,268 B2 | | 9/2010 | Webb et al. | |
| 2001/0027458 A1 | * | 10/2001 | Wakayama | 707/517 |
| 2002/0065976 A1 | * | 5/2002 | Kahn et al. | 711/1 |
| 2002/0073403 A1 | * | 6/2002 | Fleehart et al. | 717/131 |
| 2003/0120678 A1 | * | 6/2003 | Hill et al. | 717/120 |
| 2003/0121024 A1 | * | 6/2003 | Hill et al. | 717/107 |
| 2004/0015946 A1 | * | 1/2004 | Te'eni et al. | 717/169 |
| 2004/0046785 A1 | * | 3/2004 | Keller | 718/106 |
| 2004/0049509 A1 | * | 3/2004 | Keller et al. | 707/100 |
| 2004/0205689 A1 | * | 10/2004 | Ellens et al. | 717/100 |
| 2005/0144619 A1 | * | 6/2005 | Newman | 717/177 |

\* cited by examiner

*Primary Examiner* — Don Wong
*Assistant Examiner* — Anibal Rivera
(74) *Attorney, Agent, or Firm* — Harrity & Harrity, LLP

(57) ABSTRACT

A device may store dependency information for a group of software components provided by a technical computing environment. The group of software components may include a first software component and a second software component and may identify the second software component as being a dependent software component of the first software component. The device may obtain an application generated via the technical computing environment and may determine that the application invokes the first software component. The device may access the dependency information based on the application invoking the first software component and may determine that the first software component invokes the second software component based on the dependency information. The device may generate a deployable form of the application that allows the application to run in another computing environment.

20 Claims, 16 Drawing Sheets

FUNCTIONAL DEPENDENCY ANALYSIS

DETAILED DESCRIPTION

The following detailed description of example implementations refers to the accompanying drawings. The same reference numbers in different drawings may identify the same or similar elements.

Systems and/or methods described herein may determine functional dependencies of software components of a computer program using a hybrid strategy. The hybrid strategy may include determining which software components are known software components whose functional dependencies have been previously determined and stored in a database and which software components are new or unknown software components that have not been previously analyzed and/or whose functional dependencies have not been previously determined. The functional dependencies for the known software components may be looked up in the database. The functional dependency for the new or unknown software components may be determined by analyzing source code of the new or unknown software components.

The hybrid strategy may allow functional dependencies for software components to be quickly and accurately determined when generating an object for allowing the computer program to run in a target computing environment. The hybrid strategy may package only the software components that are needed to run the computer program in the target computing environment. The generated object, therefore, may be smaller and/or easier to transport to the target computing environment and/or may provide increased protection of intellectual property by limiting an exposure of the intellectual property to only that which is necessary for running the computer program in the target computing environment.

Figure 1A:
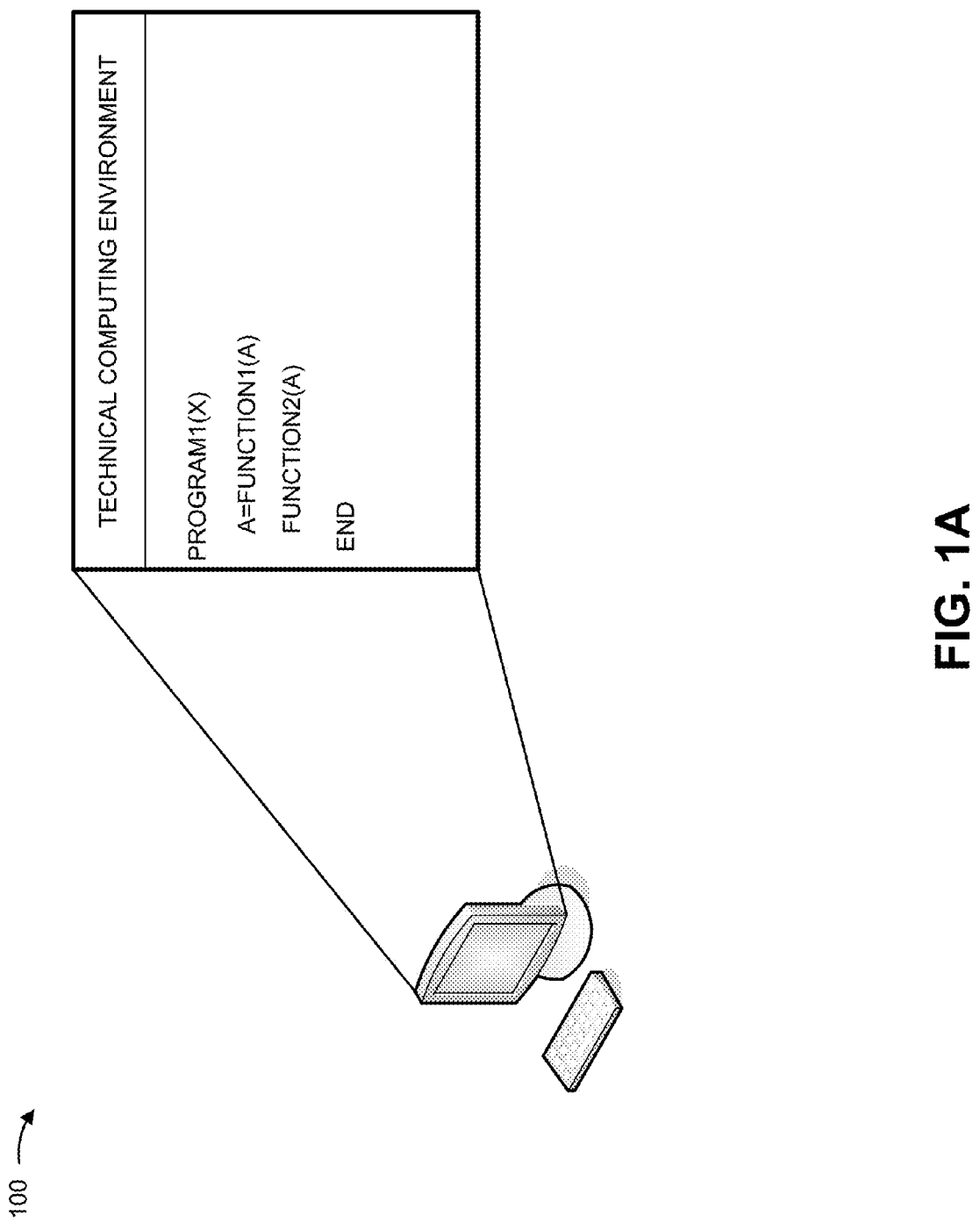
FIGS. 1A-1E are diagrams of an overview of an example implementation described herein.

FIGS. 1A-1E are diagrams of an overview 100 of an example implementation described herein. For overview 100, assume that a user writes a computer program within a technical computing environment (TCE) and that the user desires to package the computer program so that the computer program can run in a target computing environment. Further, assume that the TCE provides a set of software components (e.g., a function, a collection of functions, a file containing a serialized form of a software object, a data file, a higher-level software construct (e.g., a Simulink model file), a resource and/or a capability of the TCE (e.g, high resolution graphics, and/or another type of structured software object that had dependencies and/or satisfies the dependencies of one or more other software components) that may be used by the user when writing the computer program. As shown in FIG. 1A, the computer program, Program1 calls two software components, Function1 and Function2.

Figure 1B:
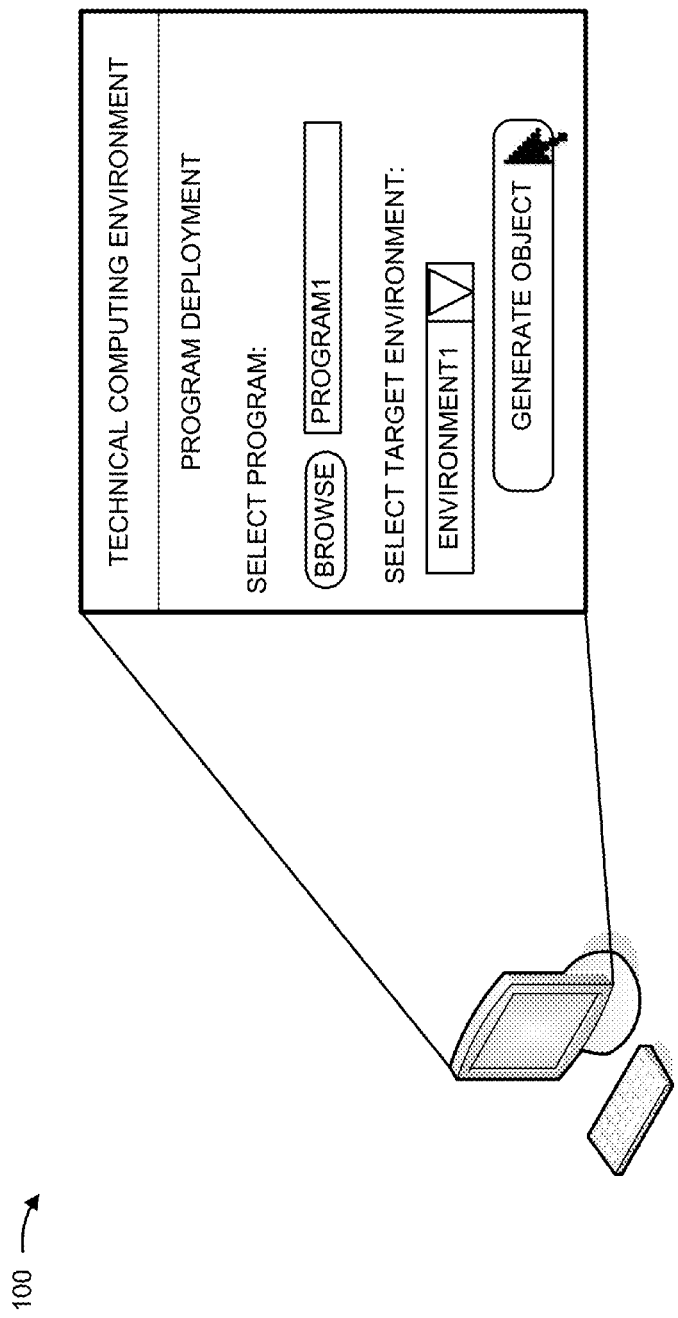

For FIG. 1B, assume that the user selects a program deployment function, provided by the TCE, for generating an object for executing the computer program in the target computing environment. Further assume that, in response to the selection, the TCE provides a user interface associated with the program deployment function. As shown in FIG. 1B, the user provides information identifying the computer program into a text block provided by the user interface and selects the option "GENERATE OBJECT" to cause the TCE to generate the object.

Figure 1C:
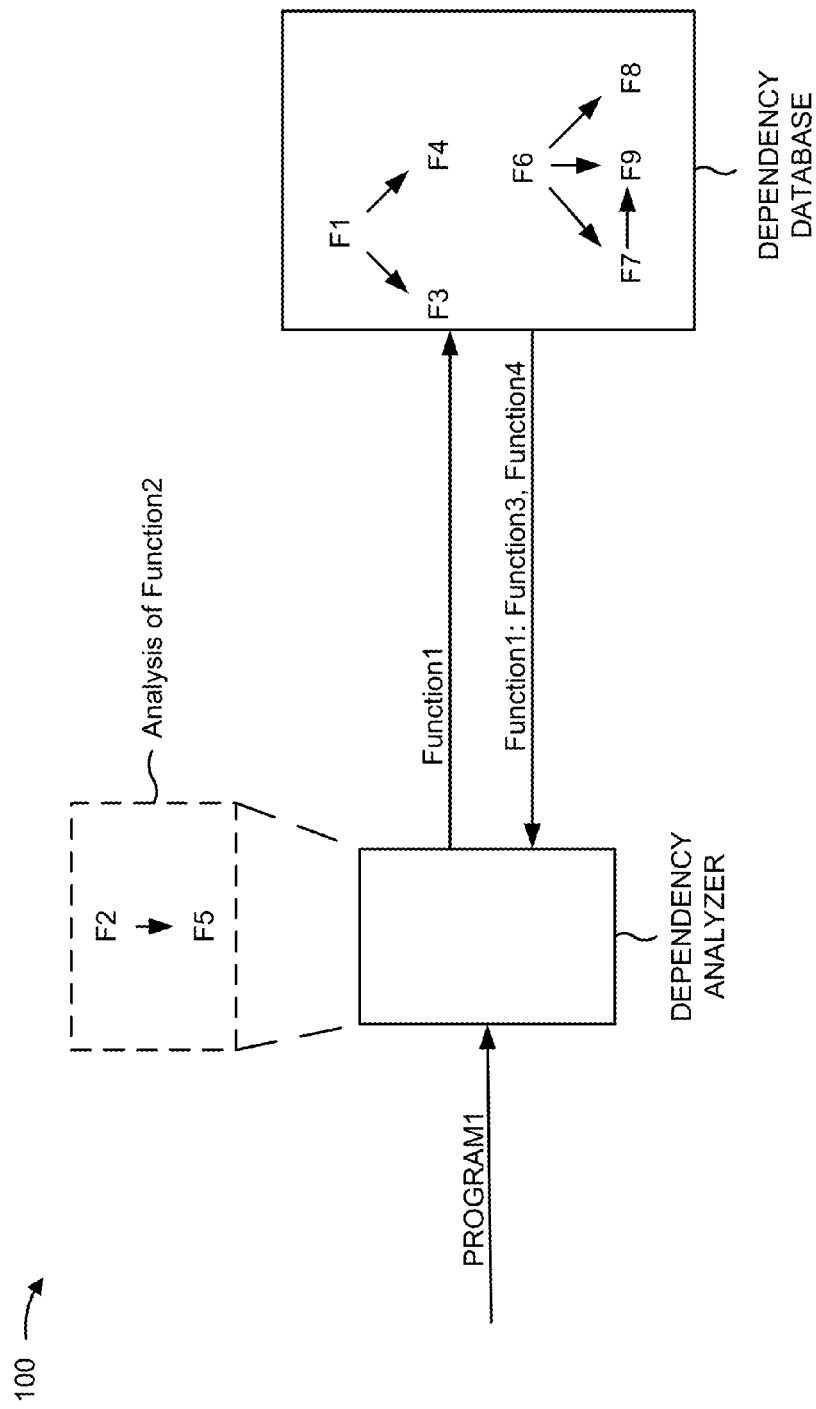

Referring now to FIG. 1C, in response to the user selecting the option, the computer program may be provided to the TCE. The TCE may use a dependency analyzer to analyze the computer program to identify software components that are required for the computer program to run in the target environment (e.g., software components called by the computer program that are available in the TCE but are not available in the target environment). Based on the analysis, the dependency analyzer may determine that the computer program calls the two software components, Function1 and Function2.

The dependency analyzer may examine Function1 and Function2. Based on the examination, the dependency analyzer may determine that Function1 is a known software component, the dependencies for which have been previously determined and stored in a dependency database. The dependency analyzer may determine that Function2 has not previously been analyzed and that the dependencies for Function2 are not known. Based on Function1 being a known software component, the dependency analyzer may perform a look-up operation in the dependency database to determine the functional dependencies for Function1. Based on Function2 not having been previously analyzed, the dependency analyzer may analyze the source code of Function2 to determine dependencies for Function2. As shown in FIG. 1C, based on performing the look-up operation, the dependency analyzer determines that Function3 and Function4 depend from Function1 and, based on analyzing Function 2, the dependency analyzer determines that Function5 depends from Function2.

Figure 1D:
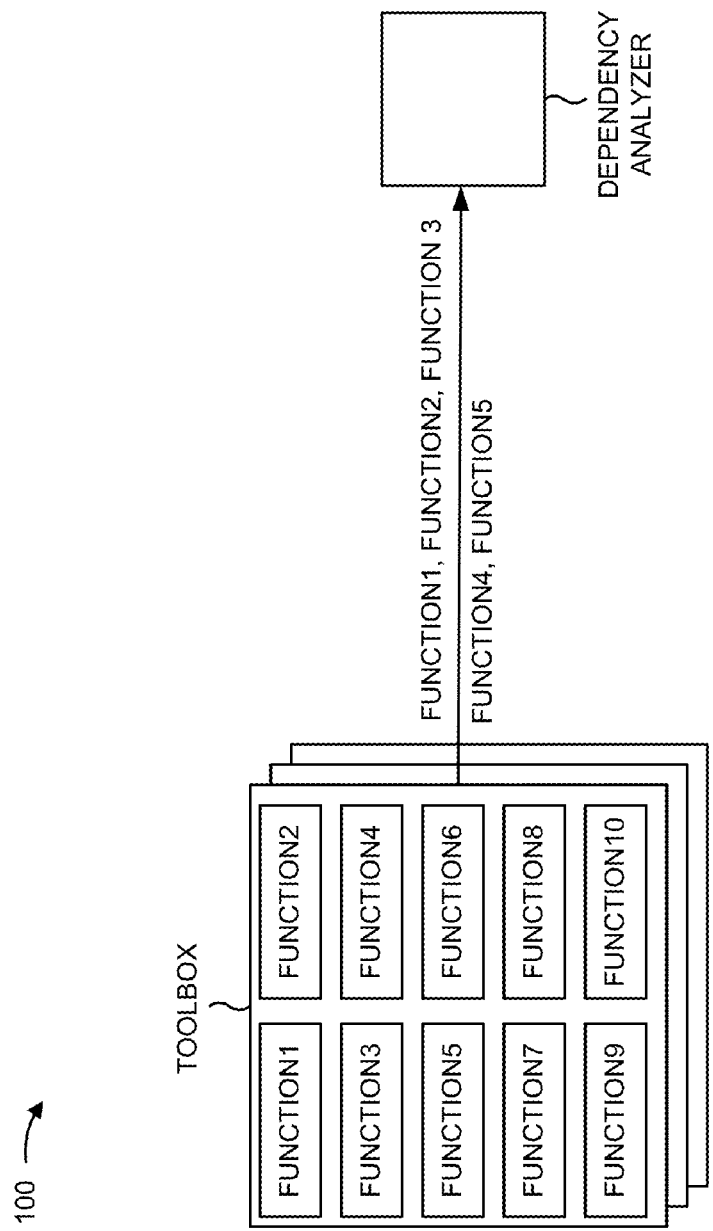
Figure 1E:
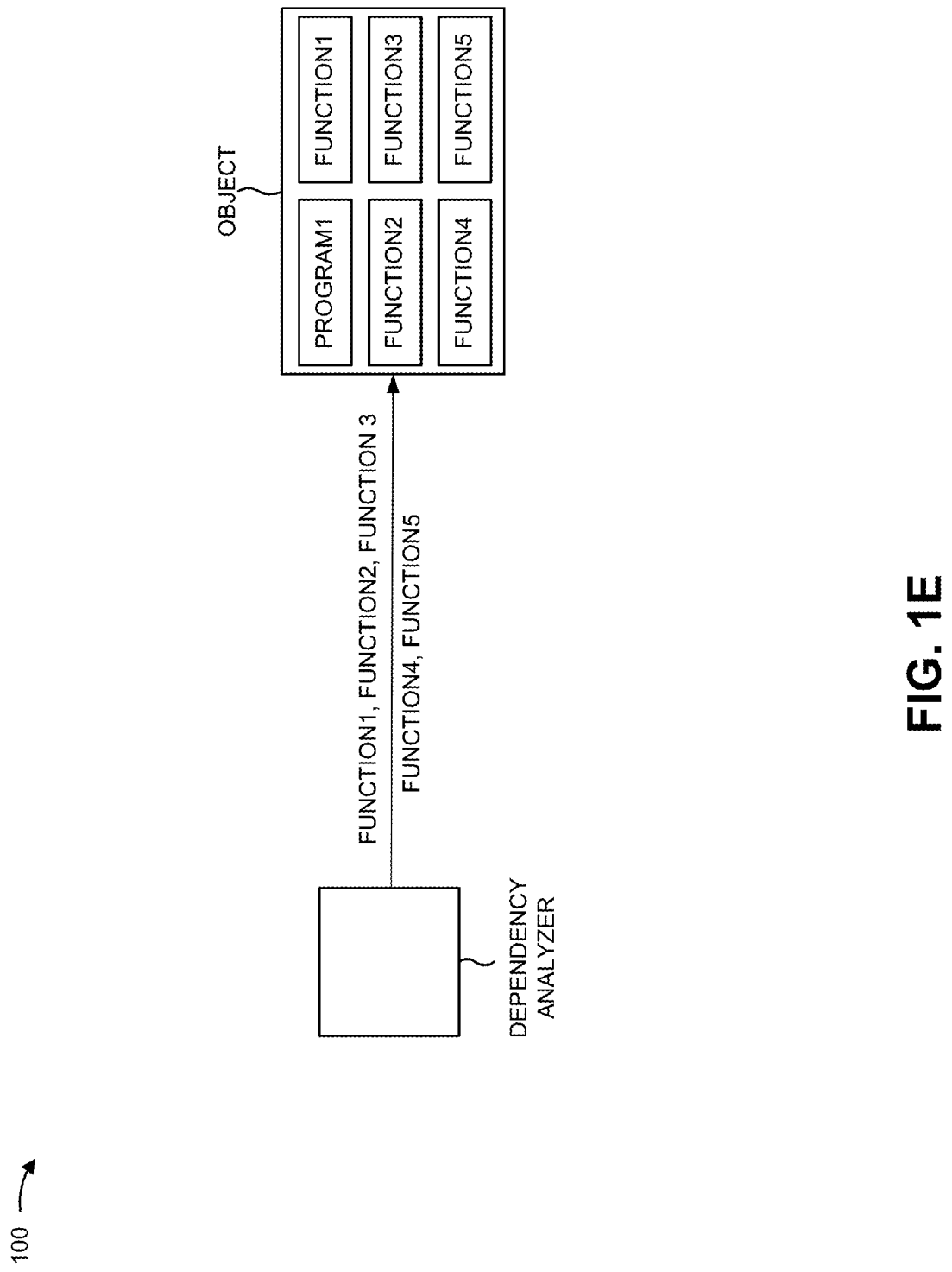

Referring now to FIG. 1D, the compiler component may obtain files corresponding to the software components called by the computer program (Function1, Function2) and files for the software components that are called by Function1 and Function2 (Function3, Function4, Function5). Referring now to FIG. 1E, the compiler component may generate an object that includes the obtained files and allows the computer program to run in the target computing environment.

Figure 2:
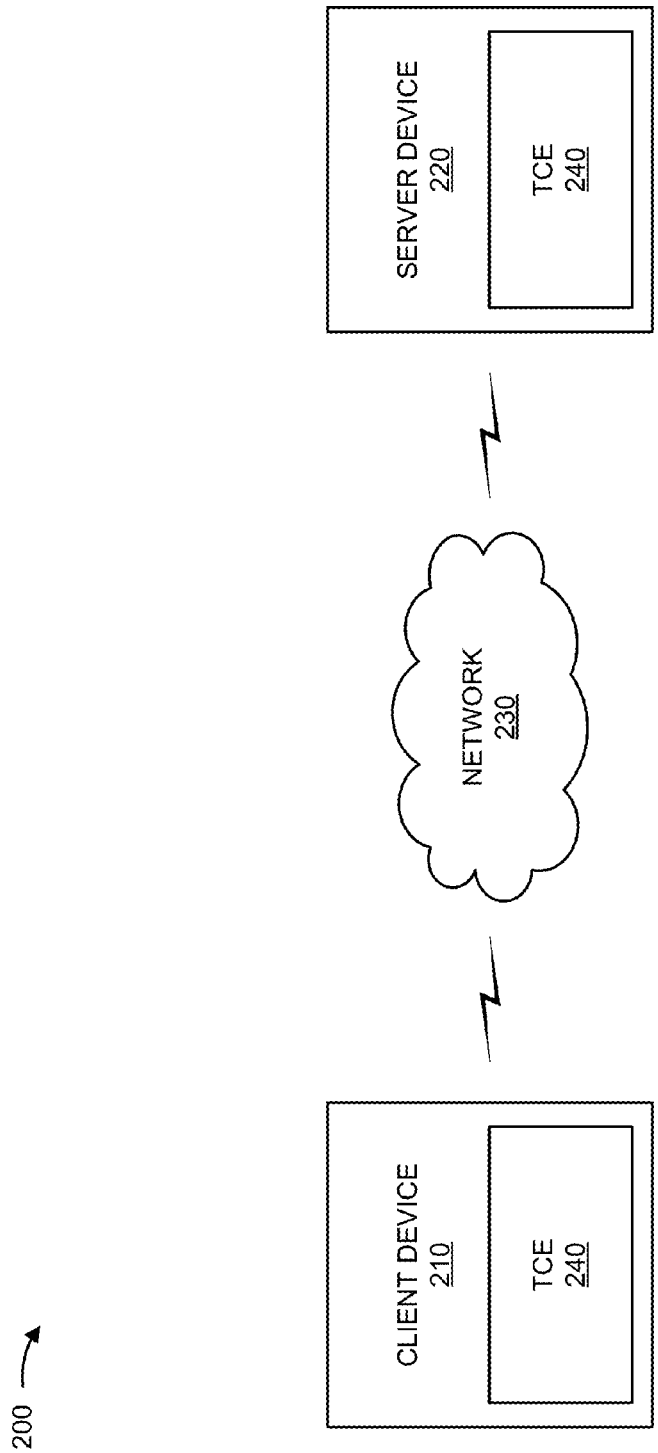
FIG. 2 is a diagram of an example environment in which systems and/or methods described herein may be implemented.

FIG. 2 is a diagram of an example environment 200 in which systems and/or methods described herein may be implemented. As illustrated, environment 200 may include a client device 210 interconnected with a server device 220 via a network 230. Components of environment 200 may interconnect via wired and/or wireless connections.

Client device 210 may include one or more devices that are capable of communicating with server device 220 via network 230. For example, client device 210 may include a laptop computer, a personal computer, a tablet computer, a desktop computer, a workstation computer, a smart phone, a personal digital assistant (PDA), and/or other computation and communication devices.

Server device 220 may include one or more server devices, or other types of computation and communication devices, that gather, process, and/or provide information in a manner described herein. Server device 220 may include a device that is capable of communicating with client device 210 (e.g., via network 230). For example, server device 220 may include one or more laptop computers, personal computers, workstation computers, servers, central processing units (CPUs), graphical processing units (GPUs), application-specific integrated circuits (ASICs), field-programmable gate arrays (FPGAs), etc. In some implementations, server device 220 may include TCE 240 and may perform some or all of the functionality described herein for client device 210. Alternatively, server device 220 may be omitted and client device 210 may perform all of the functionality described herein for client device 210.

Network 230 may include a network, such as a local area network (LAN), a wide area network (WAN), a metropolitan area network (MAN), a telephone network, such as the Public Switched Telephone Network (PSTN) or a cellular network, an intranet, the Internet, another type of network and/or a combination of these and/or other types of networks.

TCE 240 may be provided within a computer-readable medium of client device 210. Alternatively, or additionally, TCE 240 may be provided in another device (e.g., server device 220) that is accessible by client device 210. TCE 240 may include hardware or a combination of hardware and software that provides a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc. In some implementations, TCE 240 may include a dynamically-typed programming language (e.g., the M language, a MATLAB® language, a MATLAB-compatible language, a MATLAB-like language, etc.) that can be used to express problems and/or solutions in mathematical notations.

For example, TCE 240 may use an array as a basic element, where the array may not require dimensioning. These arrays may be used to support array-based programming where an operation may apply to an entire set of values included in the arrays. Array-based programming may allow array-based operations to be treated as high-level programming that may allow, for example, operations to be performed on entire aggregations of data without having to resort to explicit loops of individual non-array operations. In some implementations, TCE 240 may be adapted to perform matrix and/or vector formulations that can be used for data analysis, data visualization, application development, simulation, modeling, algorithm development, etc. These matrix and/or vector formulations may be used in many areas, such as statistics, image processing, signal processing, control design, life sciences modeling, discrete event analysis and/or design, state based analysis and/or design, etc.

TCE 240 may further provide mathematical functions and/or graphical tools (e.g., for creating plots, surfaces, images, volumetric representations, etc.). In some implementations, TCE 240 may provide these functions and/or tools using toolboxes (e.g., toolboxes for signal processing, image processing, data plotting, parallel processing, etc.). Alternatively, or additionally, TCE 240 may provide these functions as block sets or in another way, such as via a library, etc.

TCE 240 may be implemented as a text-based environment (e.g., MATLAB software; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; Modelica or Dymola from Dynasim; etc.); a graphically-based environment (e.g., Simulink® software, Stateflow® software, SimEvents® software, Simscape™ software, etc., by The MathWorks, Inc.; VisSim by Visual Solutions; LabView® by National Instruments; Dymola by Dynasim; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhapsody or Tau from Telelogic; Ptolemy from the University of California at Berkeley; aspects of a Unified Modeling Language (UML) or SysML environment; etc.); or another type of environment, such as a hybrid environment that includes one or more of the above-referenced text-based environments and one or more of the above-referenced graphically-based environments.

TCE 240 may include a programming language (e.g., the MATLAB language) that may be used to express problems and/or solutions in mathematical notations. The programming language may be dynamically typed and/or array-based. In a dynamically typed array-based computing language, data may be contained in arrays and data types of the data may be determined (e.g., assigned) at program execution time.

For example, suppose a program, written in a dynamically typed array-based computing language, includes the following statements:

A='hello'
A=int32([1, 2])
A=[1.1, 2.2, 3.3]

Now suppose the program is executed, for example, in a TCE, such as TCE 240. During run-time, when the statement "A='hello'" is executed the data type of variable "A" may be a string data type. Later when the statement "A=int32([1, 2])" is executed the data type of variable "A" may be a 1-by-2 array containing elements whose data type are 32 bit integers. Later, when the statement "A=[1.1, 2.2, 3.3]" is executed, since the language is dynamically typed, the data type of variable "A" may be changed from the above 1-by-2 array to a 1-by-3 array containing elements whose data types are floating point. As can be seen by this example, data in a program written in a dynamically typed array-based computing language may be contained in an array. Moreover, the data type of the data may be determined during execution of the program. Thus, in a dynamically type array-based computing language, data may be represented by arrays and data types of data may be determined at run-time.

TCE 240 may provide mathematical routines and a high-level programming language suitable for non-professional programmers and may provide graphical tools that may be used for creating plots, surfaces, images, volumetric representations, or other representations. TCE 240 may provide these routines and/or tools using toolboxes (e.g., toolboxes for signal processing, image processing, data plotting, parallel processing, etc.). TCE 240 may also provide these routines in other ways, such as, for example, via a library, local or remote database (e.g., a database operating in a computing cloud), remote procedure calls (RPCs), and/or an application programming interface (API). TCE 240 may be configured to improve runtime performance when performing computing operations. For example, TCE 240 may include a just-in-time (JIT) compiler.

Although FIG. 2 shows example components of environment 200, in some implementations, environment 200 may include fewer components, different components, differently arranged components, and/or additional components than those depicted in FIG. 2. Alternatively, or additionally, one or more components of environment 200 may perform one or more tasks described as being performed by one or more other components of environment 200.

Figure 3:
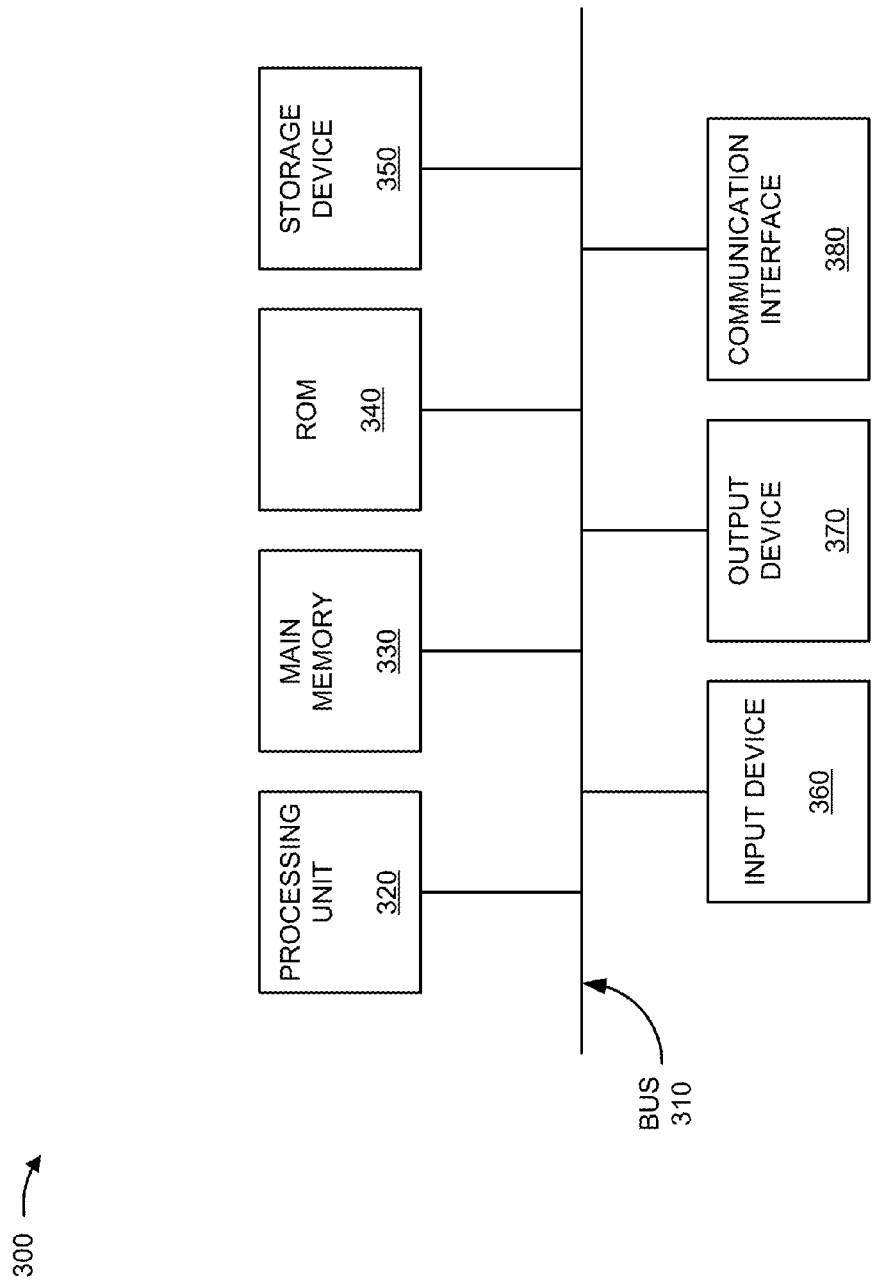
FIG. 3 is a diagram of example components of one or more devices of FIG. 2.

FIG. 3 is an example diagram of a device 300 that may correspond to one or more of the devices of environment 200. As illustrated, device 300 may include a bus 310, a processing unit 320, a main memory 330, a read-only memory (ROM) 340, a storage device 350, an input device 360, an output device 370, and/or a communication interface 380. Bus 310 may include a path that permits communication among the components of device 300.

Processing unit 320 may include one or more processors, microprocessors, or other types of processing units that may interpret and execute instructions. Main memory 330 may include one or more random access memories (RAMs) or other types of dynamic storage devices that may store information and/or instructions for execution by processing unit 320. ROM 340 may include one or more ROM devices or other types of static storage devices that may store static information and/or instructions for use by processing unit 320. Storage device 350 may include a magnetic and/or optical recording medium and its corresponding drive.

Input device 360 may include a mechanism that permits a user to input information to device 300, such as a keyboard, a camera, an accelerometer, a gyroscope, a mouse, a pen, a microphone, voice recognition and/or biometric mechanisms, a remote control, a touch screen, a neural interface, etc. Output device 370 may include a mechanism that outputs information to the user, including a display, a printer, a speaker, etc. Communication interface 380 may include any transceiver-like mechanism that enables device 300 to communicate with other devices, networks, and/or systems. For example, communication interface 380 may include mechanisms for communicating with another device or system via a network.

As described herein, device 300 may perform certain operations in response to processing unit 320 executing software instructions contained in a computer-readable medium, such as main memory 330. A computer-readable medium may be defined as a non-transitory memory device. A memory device may include space within a single physical memory device or spread across multiple physical memory devices. The software instructions may be read into main memory 330 from another computer-readable medium, such as storage device 350, or from another device via communication interface 380. The software instructions contained in main memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in some implementations, device 300 may include fewer components, different components, differently arranged components, and/or additional components than depicted in FIG. 3. Alternatively, or additionally, one or more components of device 300 may perform one or more tasks described as being performed by one or more other components of device 300.

Figure 4A:
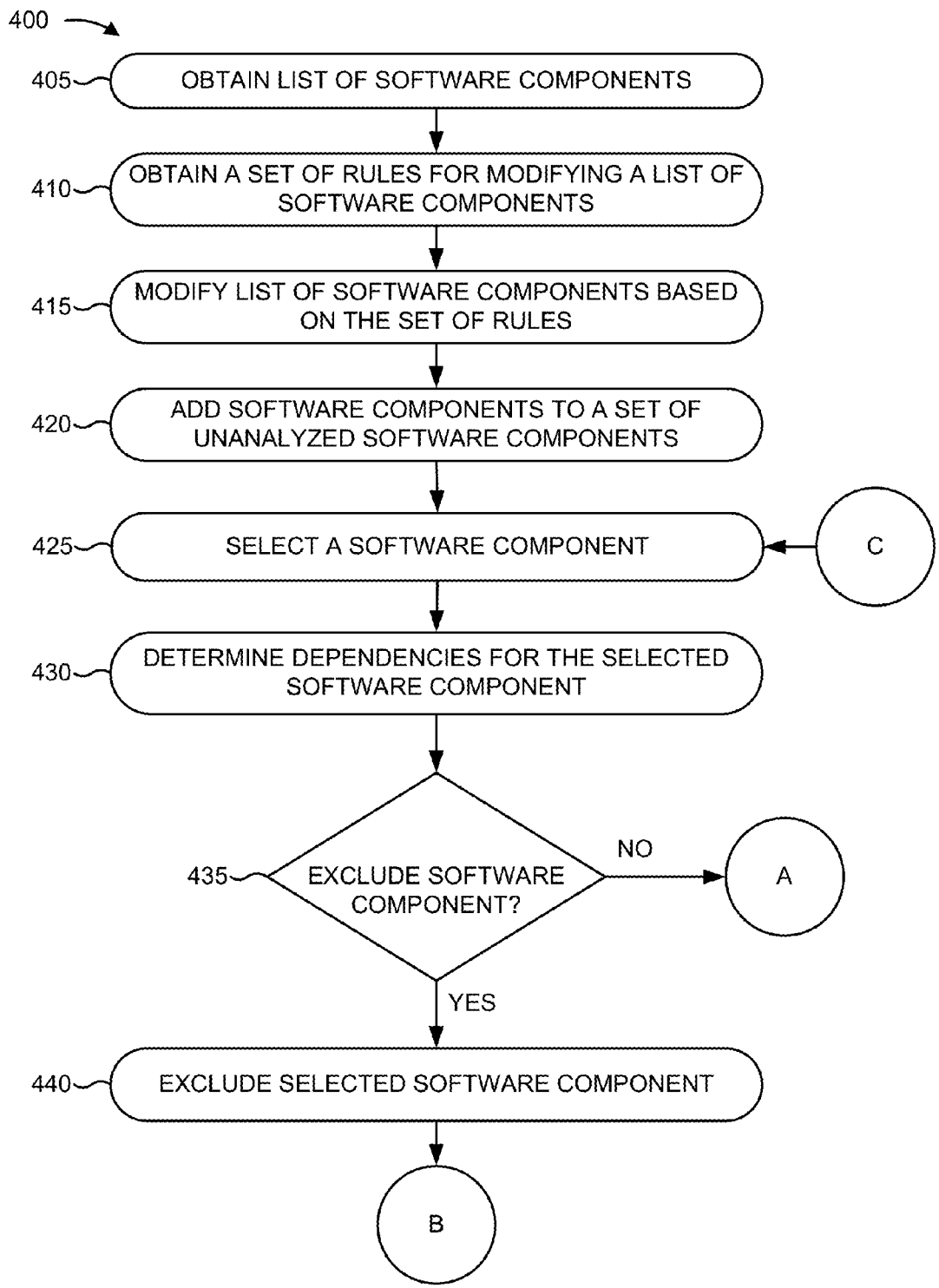
FIGS. 4A-4C are a flow chart of an example process for generating a functional dependency database for a computer program.
Figure 4B:
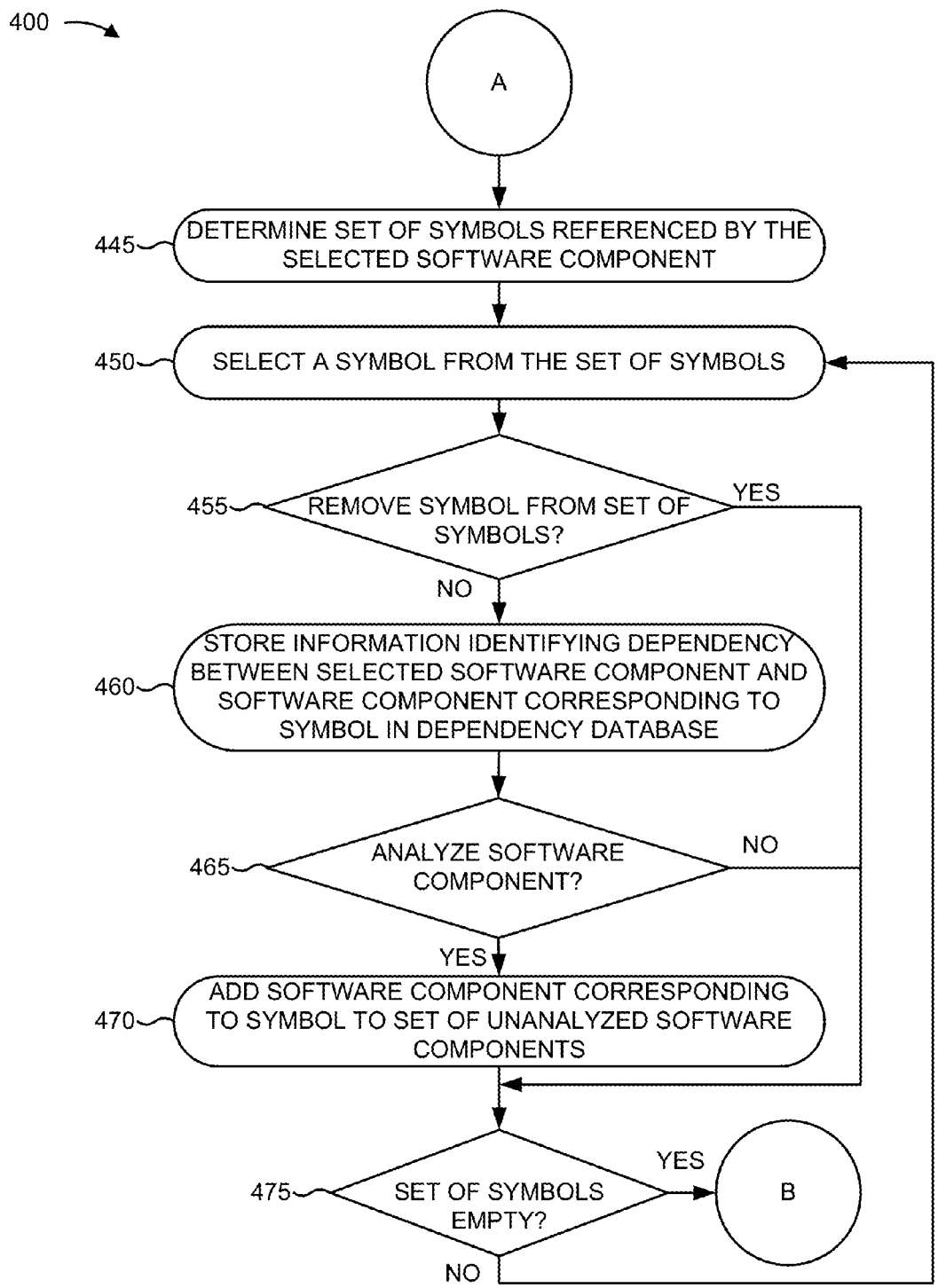
Figure 4C:
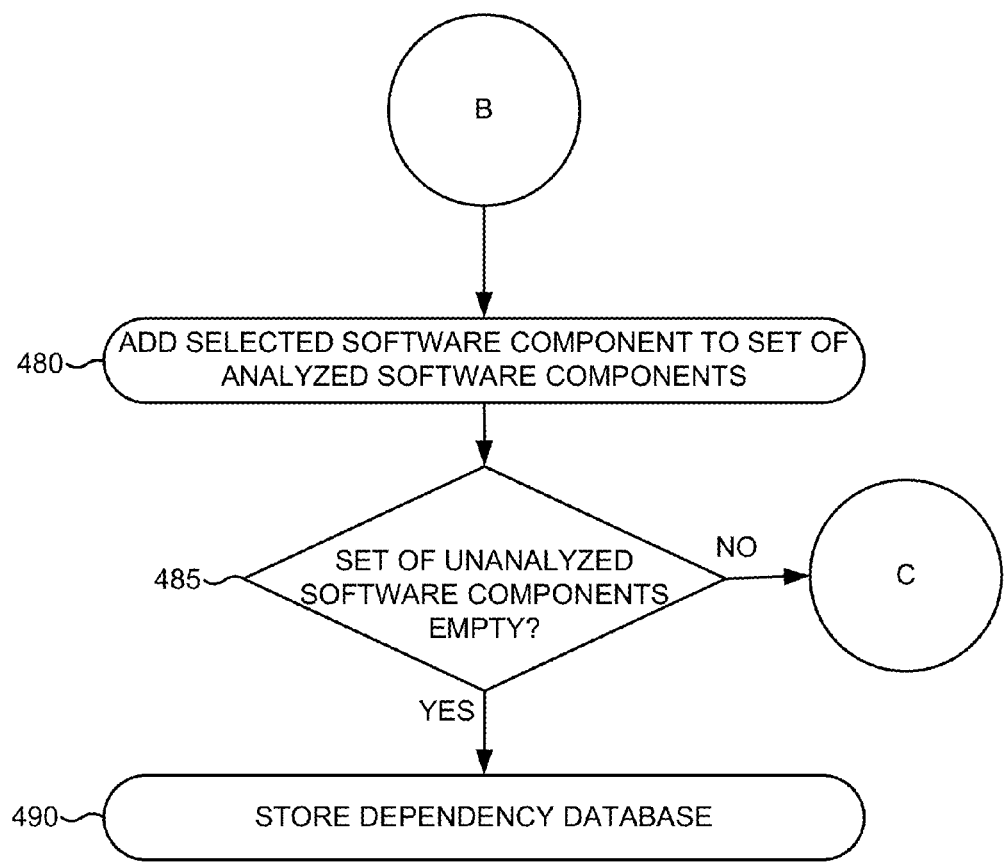

FIGS. 4A-4C are a flow chart of a process 400 for generating a functional dependency database for a computer program. In some implementations, process 400 may be performed by client device 210 (e.g., TCE 240). In some implementations, one or more blocks of process 400 may be performed by one or more devices instead of, or possibly in conjunction with, client device 210.

As shown in FIG. 4A, process 400 may include obtaining a list of software components (block 405, FIG. 4A). For example, client device 210 (e.g., TCE 240) may obtain a list of software components included in and/or provided by a computer program. The software components may include a function, a collection of functions, a file containing a serialized form of a software object, including the software object's class name, a data file, a higher-level software construct (e.g., a Simulink model file), a resource and/or a capability of the TCE (e.g, high resolution graphics), and/or another type of structured software object that had dependencies and/or satisfies the dependencies of one or more other software components.

In some implementations, the list of software components may be an externally-specified list of software components. For example, a user may use a text-based programming language to create a computer program. The text-based programming language may be implemented by a computing environment (e.g., TCE 240) that allows the user to manipulate textual program elements to create program code (e.g., the computer program) that includes a collection of instructions for performing one or more specific tasks.

In some implementations, the computer program may include multiple portions. Each portion may be implemented by one or more collections of instructions stored as one or more files in a memory (e.g., memory 330 and/or storage device 350). For example, the computer program may include a software component, such as, for example, a function, for performing a particular task. The function may be implemented as a collection of functions that are stored in the memory as a collection of files. In some implementations, the computer program may be stored under a particular root directory in the memory. One or more of the multiple portions of the computer program may be stored as one or more files under one or more different sub-directories. In some implementations, one or more of the sub-directories may be stored under the particular root directory. Additionally, or alternatively, one or more of the sub-directories may be stored under a root directory that is different from the particular root directory. For example, the computer program may include toolboxes that provide a collection of functions related to performing a particular type of task (e.g., image processing, mapping, etc.). For each toolbox, one or more files including a collection of instructions for implementing the collection of functions provided by the toolbox may be stored under one or more sub-directories associated with the toolbox. In some implementations, the toolbox may have a configuration file that lists the one or more sub-directories.

The user may cause a collection of files corresponding to the computer program to be stored in a memory. Client device 210 may obtain a list of file names associated with the collection of files. The list of file names may identify one or more files for software components used by the computer program.

Process 400 may include obtaining a set of rules for modifying a list of software components (block 410). For example, client device 210 (e.g., TCE 240) may obtain a set of rules for modifying a list of software components. The set of rules may include information, such as, for example, metadata, describing one or more software components included in a list of software components. In some implementations, the metadata may identify a set of known functional dependencies for one or more software components included in and/or provided by the computer program.

In some implementations, client device 210 may obtain the set of rules based on metadata associated with a software component. The metadata may identify one or more rules for modifying a set of dependent software components. In some implementations, the metadata may be in a file that includes the software component, an external file, and/or a set of rules stored in the dependency database. For example, a particular function invoked by the computer program may be included in a file. The file may include metadata identifying one or more rules for modifying a set of dependent functions associated with the particular function. Client device 210 may determine the set of rules based on the metadata.

In some implementations, client device 210 may obtain the set of rules in one or more parts. For example, a first part of the set of rules may be provided by TCE 240 and a second part of the set of rules may be provided by a user of TCE 240. Client device 210 may combine the one or more parts according to policies determined by a provider of TCE 240. For example, client device 210 may determine that a rule provided by the user violates the policies and client device 210 may exclude the rule from the combined set of rules.

In some implementations, the set of rules may include a rule for adding one or more software components to the list of software components. For example, a particular software component may reference a software component, such as, for example, a function, that calls one or more other software components included in the computer program and an analysis of the computer program may not identify the one or more other software components as being included in the set of dependent software components for the particular software component. The rule may require that the one or more other software components are to be added to the list of software components.

In some implementations, the set of rules may include a rule for removing one or more software components from the list of software components. For example, the set of rules may include a rule for preventing certain software components from being included in a deployable form of the computer program. In some implementations, the rule may require one or more software components to be removed from the list of software components when the target environment is different from and/or is the same as a computing environment used to create the computer program (e.g., TCE 240). For example, the computer program may be developed in a proprietary computing environment and a developer of the proprietary computing environment may desire to prevent certain software components from being used outside of the proprietary computing environment (e.g., restrict the use of certain software components to users having purchased, licensed, etc. copies of the proprietary computing environment). Client device 210 may generate an exclusion list for preventing the certain software components from being deployed. The exclusion list may identify one or more software components that are to be removed from the list of software components.

In some implementations, the rule for adding one or more software components to the list of software components may be stored separately from the set of rules and/or the rule for removing the one or more software components. For example, client device 210 may generate a rules database. The rules database may be associated with the dependency database and may include rules for adding software components to the list of software components.

Process 400 may include modifying the list of software components based on the set of rules (block 415). For example, the set of rules may identify one or more software components to be added to the list of functions when the list of functions includes a particular software component. Client device 210 (e.g., TCE 240) may determine that the list of software components includes the particular software component and may add the one or more software components to the list of software components.

Process 400 may include adding software components included in the modified list of software components to a set of unanalyzed software components (block 420). For example, client device 210 (e.g., TCE 240) may identify each software component included in the modified list of software components. Client device 210 may determine a set of unanalyzed software components that includes each identified software component.

Process 400 may include selecting a software component from the set of unanalyzed software components (block 425). For example, client device 210 (e.g., TCE 240) may select a software component, from the set of unanalyzed software components, for determining dependency information for the selected software component.

Process 400 may include determining information regarding dependencies for the selected software component based on the set of rules (block 430). For example, the set of rules may include information identifying functional dependencies for the selected software component. Client device 210 (e.g., TCE 240) may determine the functional dependencies based on the information and may store information identifying the functional dependencies in a dependency database. In some implementations, the information identifying the functional dependencies may identify one or more software components that are invoked by the selected software component. Client device 210 may store information identifying the one or more software components as being dependent software components of the selected software component in the dependency database.

Process 400 may include determining whether to exclude the selected software component based on the set of rules (block 435). For example, the set of rules may identify one or more software components that should not be analyzed for determining dependency information and/or should not be packaged (e.g., for deployment to a different TCE). Client device 210 (e.g., TCE 240) may determine whether the selected software component corresponds to the identified one or more software components.

In those instances where the selected software component is to be excluded (block 435—YES), process 400 may include excluding the selected software component (block 440). For example, client device 210 (e.g., TCE 240) may not determine dependency information for the selected software component and/or may store information indicating that the selected software component should not be included in an application being packaged for deployment to another TCE. In some implementations, client device 210 may remove the selected software component from the list of software components and/or the set of unanalyzed software components and process 400 may continue as described in connection with block 480 (FIG. 4C).

In those instances where the selected software component is not to be excluded (block 435—NO), process 400 may include determining a set of symbols referenced by the selected software component (block 445, FIG. 4B). For example, client device 210 (e.g., TCE 240) may analyze the selected software component to identify one or more symbols referenced by the selected software component. Each symbol may include one or more characters for invoking a particular software component. In some implementations, client device 210 may perform a textual analysis of one or more lines of code for implementing the selected software component to determine the set of symbols referenced by the selected function.

Process 400 may include selecting a symbol from the set of symbols (block 450) and determining whether to remove the symbol from the group of symbols (block 455). For example, one or more software components invoked by the computer program, may be included in one or more files stored in a memory associated with client device 210. Client device 210 (e.g., TCE 240) may analyze each file to determine whether the selected symbol corresponds to a software component that can be deployed to a target environment. Client device 210 may not remove the selected symbol from the set of symbols when the symbol corresponds to a software component that can be deployed to the target environment.

In some implementations, client device 210 may determine that the selected symbol corresponds to a software component that is not to be deployed to the target environment and/or that the symbol corresponds to something other than a software component. Client device 210 may remove the selected symbol from the group of symbols based on the selected symbol corresponding to the software component that is not to be deployed to the target environment and/or to something other than a software component.

In some implementations, client device 210 may determine that the selected symbol correspond to a target of an assignment. For example, a symbol may be included in a line of program code followed by a particular operator. Client device 210 may determine that the symbol corresponds to the target of an assignment based on the symbol being followed by the particular operator and may remove the symbol from the set of symbols.

As an example, assume that the computer program includes the following line of code:

b=bar(x).

Client device 210 may analyze the line of code and may identify the symbol "b" followed by the operator "=." Client device 210 may determine that the operator "=" is associated with an operation of an assignment. Based on the symbol "b" being followed by the operator "=," client device 210 may determine that the symbol "b" does not correspond to a function called by the computer program.

In some implementations, client device 210 may determine that a symbol corresponds to a shared function that is available in one or more target environments associated with the computer program (e.g., a function included in a shared library, a function included in a dynamic-link library (DLL), etc.). Client device 210 may determine that the shared function is not required to be included in a deployable form of the computer program and may remove the selected symbol from the set of symbols. Additionally, or alternatively, client device 210 may determine that the shared function must be included in the deployable form of the computer program and may include the dynamic link library that defines the shared function in the deployable form of the computer program.

In some implementations, client device 210 may not be able to determine whether the selected symbol corresponds to a software component. For example, client device 210 may analyze the selected symbol and may not be able to determine a software component corresponding to the selected symbol. Client device 210 may remove the selected symbol from the set of symbols based on not being able to identify a corresponding software component for the selected symbol.

Additionally, or alternatively, client device 210 may provide a notification to the user. The notification may indicate that a software component corresponding to the selected symbol could not be determined and/or that no action was taken with respect to the selected symbol. In some implementations, the notification may request that the user provide information identifying the corresponding software component and/or information identifying functional dependencies for the corresponding software function. Client device 210 may not remove the selected symbol from the set of symbols based on the information identifying the corresponding software component and/or the information identifying the functional dependencies for the corresponding software component.

In those instances where the selected symbol is removed from the set of symbols (block 455—YES), process 400 proceed as described in connection with block 475. In those instances where the selected symbol is not removed from the set of symbols (block 455—NO), process 400 may include storing information identifying a dependency between the selected software component and the software component corresponding to the selected symbol in a dependency database (block 460). For example, client device 210 (e.g., TCE 240) may store information identifying the software component corresponding to the selected symbol as being a dependent software component relative to the selected software component in a dependency database. In some implementations, client device 210 (e.g., TCE 215) may compute a transitive closure for the selected software component. The transitive closure may include a directed graph that depicts the dependency relationship between the selected software component and the software component corresponding to the selected symbol.

As an example, assume that a first function, "A," calls a second function, "B," and that the second function calls a third function "C" and a fourth function "D." For the first function, client device 210 may generate the following transitive closure:

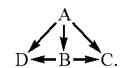

Process 400 may include determining whether the software component corresponding to the selected symbol has been analyzed (block 465). For example, client device 210 (e.g., TCE 240) may determine whether the software component corresponding to the selected symbol is included in a set of analyzed software components. The set of analyzed software components may include software components whose dependency information has been previously determined and/or stored in the dependency database. Client device 210 may determine that the software component corresponding to the selected symbol is not to be analyzed when the software component corresponding to the selected symbol is included in the set of analyzed software components.

In those instances where the software component corresponding to the selected symbol is not to be analyzed (block 465—NO), process 400 may proceed as described in connection with block 475. In those instances where the software component corresponding to the selected symbol is to be analyzed (block 465—YES), process 400 may include adding the software component corresponding to the selected symbol to the set of unanalyzed software components (block 470). For example, client device 210 (e.g., TCE 240) may determine that the software component corresponding to the selected symbol is not included in the set of analyzed software components and/or that dependency information for the software component corresponding to the selected symbol is not stored in the dependency database. Client device 210 may add the software component corresponding to the selected symbol to the set of unanalyzed software components and may remove the selected symbol from the set of symbols.

Process 400 may include determining whether the set of symbols is empty (block 475). For example, client device 210 (e.g., TCE 240) may determine whether each symbol, included in the set of symbols has been selected and/or removed from the set of symbols.

In those instances where the set of symbols is not empty (block 475—NO), process 400 may continue as described in connection with blocks 455-475 in relation to one of the unselected symbols. In those instances where the set of symbols is empty (block 475—YES), process 400 may include adding the selected software component to the set of analyzed software components (block 480). For example, client device 210 (e.g., TCE 240) may analyze the set of symbols determined for selected software component. Client device 210 may determine that the set of symbols is empty and may add the selected software component to a list of analyzed software components.

Process 400 may include determining whether the set of unanalyzed software components is empty (block 485). For example, client device 210 (e.g., TCE 240) may determine whether each software component, included in the set of unanalyzed software components, has been analyzed. Client device 210 may determine that the set of unanalyzed software components is empty when each software component included in the set of unanalyzed software components has been analyzed.

In those instances where the set of unanalyzed software components is not empty (block 485—NO), process 400 may continue as described in connection with blocks 425-485). In those instances where the set of unanalyzed software components is empty (block 485—YES), process 400 may include storing the dependency database (block 490). For example, client device 210 (e.g, TCE 240) may generate a dependency database that includes dependency information determined for the software components included in the set of analyzed software components. In some implementations, the dependency database may include information identifying the transitive closure and/or information identifying one or more rules for modifying the list software components. For example, the dependency database may include information identifying one or more rules for removing one or more software components from and/or adding one or more software components to a set of dependent software components determined for a particular software component for which dependency information is stored in the dependency database.

In some implementations, process 400 may operate continually. For example, TCE 240 (or an independent program) may operate process 400 so as to capture dependencies as they are created or updated. In this way, the dependency database may be kept up to date and accurate. Process 400 may operate in this continual manner on software components created by users of TCE 240, software components provided by TCE 240, or both. In some implementations, this continual process may be event-driven. For example, TCE 240 may provide process 400 with notification that one or more software components have changed and this notification may cause process 400 to re-compute the dependencies of those one or more software components. In some implementations, the process of continually performing the dependency analysis may pause when there are no new software components and/or updated software components to be analyzed.

While FIG. 4 shows process 400 as including a particular quantity and arrangement of blocks, in some implementations, process 400 may include fewer blocks, additional blocks, or a different arrangement of blocks. Additionally, or alternatively, some of the blocks may be performed in parallel.

Figure 5:
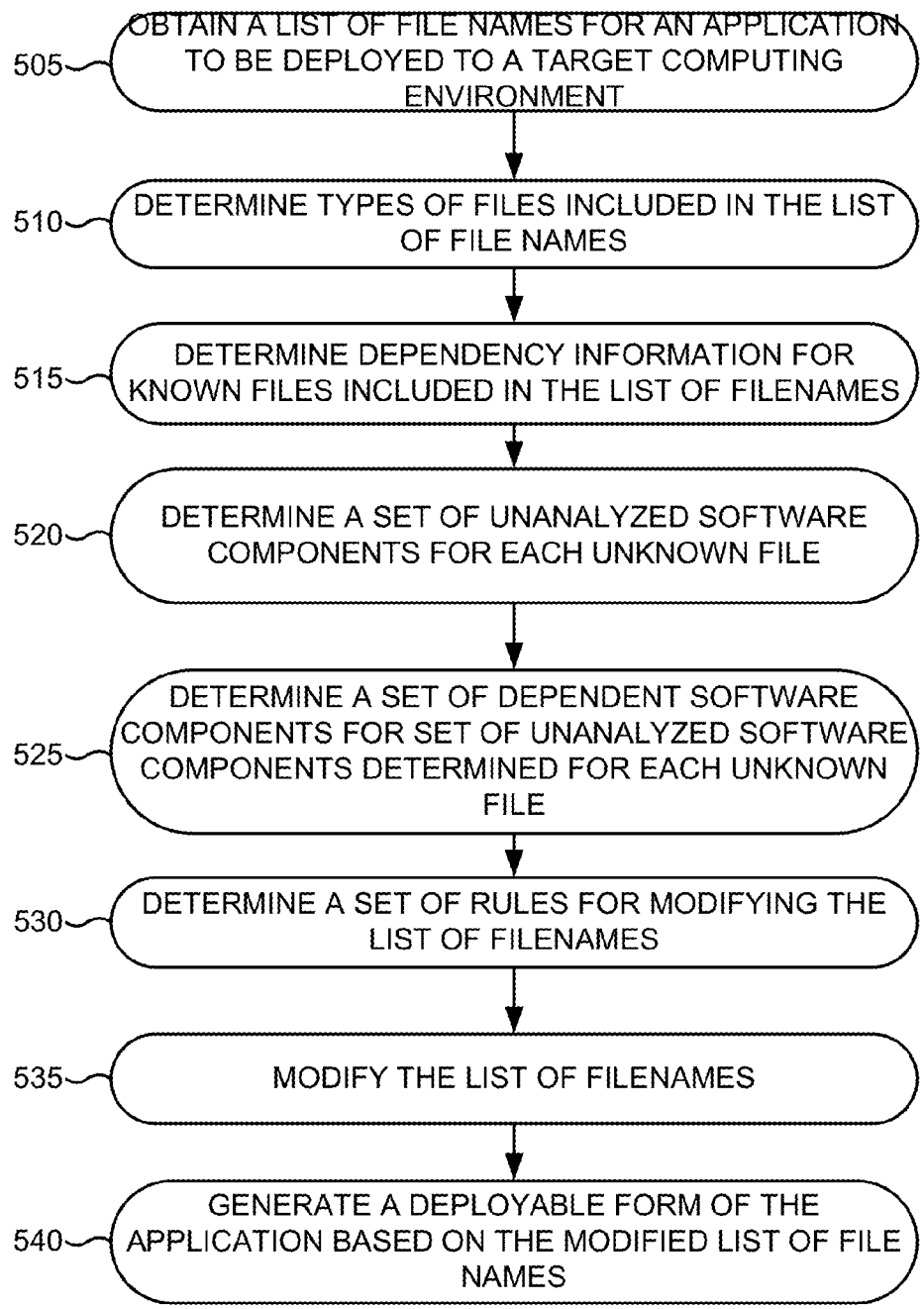
FIG. 5 is a flow chart of an example process for generating a deployable form of a computer program.

FIG. 5 is a flow chart of a process 500 for generating a deployable form of a computer program. In some implementations, process 500 may be performed by client device 210 (e.g., TCE 240). In some implementations, one or more blocks of process 500 may be performed by one or more devices instead of, or possibly in conjunction with, client device 210.

As shown in FIG. 5, process 500 may include obtaining a list of filenames for an application to be deployed to a target computing environment (block 505). For example, a user may create an application (e.g., a computer program) in a computing environment (e.g., MATLAB®, a C program environment, etc.). The application may include a set of files. Each file may include a collection of instructions for implementing one or more portions of the application. In some implementations, the set of files may include a user file that includes lines of program code typed in and/or generated by the user. Additionally, or alternatively, the set of files may include a known file that includes a software component whose dependency information has previously been determined and/or stored in a dependency database. For example, the application may include a particular function provided by the computing environment. Client device 210 may have previously determined dependency information for the particular function. The dependency information may identify one or more software components that are referenced by the particular function. The particular function may be implemented by a collection of instructions stored in a particular file and the set of files may include the particular file.

The computing environment may include an application development tool (e.g., MATLAB® Compiler) that allows the user to create a deployable form of the application for executing the application in a target computing environment. The user may access the application development tool and may provide a list of filenames corresponding to the set of files included in the application. Client device 210 (e.g. TCE 240) to receive the list of filenames via the application development tool. In some implementations, the application development tool may provide a user interface for creating a deployable form of the application. The user interface may include options (e.g., text input boxes, pull-down menus, etc.) for identifying the application. The user may provide a list of filenames that includes a filename for each file included in the set of files via the user interface.

In some implementations, the filename may include a string that specifies a full path or a partial path to a location that the file is stored in the memory. In some implementations, the filename may be a dot-qualified name of a function built-in to the computing environment (e.g., a file that includes a function included in a toolbox provided by the computing environment) or external to the computing environment (e.g., a file that includes a software component included in a shared library, such as, for example, a Java file). Client device 210 may receive the list of filenames and may obtain the set of files based on the list of filenames.

Process 500 may include determining types of files included in the list of filenames (block 510). For example, client device 210 (e.g, TCE 240) may obtain the list of filenames for the set of files. Client device 210 may analyze the list of filenames and may determine whether a file corresponding to each filename is a known file, an unknown file, and/or other types of files. In some implementations, client device 210 may determine that a file is a known file when dependency information for a software component included in the file has been previously determined and/or stored in a dependency database.

In some implementations, client device 210 may determine that a file is an unknown file when client device 210 is unable to determine whether the file includes a software component whose dependency information has been previously determined and/or stored in the dependency database and/or when client device 210 determines that the file includes a software component whose dependency information has not been previously determined and/or is not stored in the dependency database. For example, the file may be a user file that includes one or more lines of program code entered by the user. Client device 210 may determine that an analysis of the one or more lines of program code may be required to determine software components referenced by the user file and, therefore, that the user file is an unknown file.

In some implementations, client device 210 may determine the type of file by mapping the filename to a location in the memory storing the file. In some implementations, client device 210 may determine a directory (e.g., a root directory) in which files of the computing environment (e.g., files including software components included in and/or provided by the computing environment) are stored. Client device 210 may map the filename to a location in the memory storing a file corresponding to the filename. Based on the location in the memory, client device 210 may determine that the file is stored in the directory in which files of the computing environment are stored. Client device 210 may determine that the filename corresponds to a known file based on the file being stored in the directory in which files of the computing environment are stored.

In some implementations, client device 210 may determine a directory in which files created by the user are stored. Client device 210 may map the filename to a location in the memory storing a file corresponding to the filename. Based on the location in the memory, client device 210 may determine that the file is stored in a directory in which files created by the user are stored. Client device 210 may determine that the filename corresponds to an unknown file based on the file being stored in the directory in which files created by the user are stored.

In some implementations, client device 210 may determine the type of file based on comparing the filename to a list of filenames provided by the computing environment. For example, client device 210 may determine that the filename does not include a string specifying either a full or a partial path name to a file stored in a memory. Client device 210 may obtain a list of filenames for files including functions provided by a shared library. Client device 210 may compare the filename to the list of filenames for files including functions provided by the shared library and may determine that the filename matches a file name for a file that includes a function provided by the shared library. Client device 210 may determine that the filename corresponds to a shared file based on the filename matching the filename for the file that includes the function provided by the shared library.

In some implementations, client device 210 may determine the type of file based on a suffix of the filename. For example, client device 210 may determine that the computing environment requires data files to have a filename that ends with the suffix ".dat." Client device 210 may determine that the filename ends with the suffix .dat, and may determine that the filename corresponds to a data file.

Process 500 may include determining dependency information for known files included in the application (block 515). For example, client device 210 may identify a filename, included in the list of filenames, that corresponds to a known file. Client device 210 may determine a set of dependent software components for the known file. In some implementations, client device 210 may determine the set of software components based on a dependency database generated for the computing environment. The dependency database may include information identifying a set of dependent software components for each known file (e.g., each file including a software component whose dependency information has been previously determined). In some implementations, the dependency database may be generated as described in connection with process 400. Client device 210 may obtain information identifying a set of dependent software components for the known file by looking up the information in the dependency database.

In some implementations, the dependency database may include information identifying a transitive closure computed for the software component included in the known file. Client device 210 may determine the set of dependent software components based on the transitive closure.

In some implementations, the set of dependent software components may include a software component having a filename that is not included in the list of filenames. Client device 210 may determine a type of the file as described in connection with block 510 and may add the filename to the list of filenames. Client device 210 may determine a set of dependent software components for files corresponding to each filename, included in the list of filenames and corresponding to a known file, in a similar manner.

Process 500 may include determining a set of unanalyzed software components for each unknown file (block 520). For example, client device 210 may determine that a filename included in the list of files corresponds to a unknown file. Client device 210 may obtain the unknown file from the memory and may analyze the unknown file to determine a set of unanalyzed software components referenced by the unknown file as described in connection with blocks 405-420.

In some implementations, client device 210 may determine that a software component, included in the set of unanalyzed software components, corresponds to a filename included in the list of filenames. Client device 210 may remove the software component from the set of unanalyzed software components. Client device 210 may determine a set of unanalyzed software components for files corresponding to each filename, included in the list of filenames and corresponding to an unknown file, in a similar manner.

Process 500 may include determining a set of dependent software components for the set of unanalyzed software components determined for each unknown file (block 525). For example, client device 210 may determine a set of dependent software components for each software component included in the set of unanalyzed software components determined for each unknown file as described in connection with block 425-485. In some implementations, client device 210 may determine that a software component, included in a set of unanalyzed software components determined for an unknown file, is a known software component whose dependency information has previously been computed. Based on the dependency information having been previously computed, client device 210 may determine a set of dependent software components for the known software component from the dependency database as described in connection with block 515. For each dependent software component, client device 210 may determine whether a filename for the dependent software component is included in the list of filenames. When a filename for a dependent software component is not included in the list of filenames, client device 210 may determine a type of the file and may add the filename for the file to the list of filenames.

Process 500 may include determining a set of rules for modifying the list of filenames (block 530) and modifying the list of filenames (block 535). For example, client device 210 (e.g., TCE 240) may obtain a set of rules for adding software components to sets of dependent software components and/or removing software components from sets of dependent software components. Client device 210 may modify the list of filenames to include a filename for a software component to be added to a set of dependent software component and/or to remove a filename for a software component to be removed from a set of dependent software components based on the set of rules.

In some implementations, the set of rules may be stored in the dependency database. In some implementations, a set of rules included in the dependency database may only include rules for removing software components from sets of dependent software components and a set of rules for adding software components to sets of dependent software components may be stored in a different database. Client device 210 may obtain the set of rules for removing software components from sets of dependent software components from the dependency database and may obtain the set of rules for adding software components to sets of dependent software components from the different database.

In some implementations, the set of rules may include a rule for adding a software components called by a shared function. For example, a shared function may call a particular software component provided by TCE 240. The rule may require that the list of filenames include a filename for the particular software component when the list of filenames includes a filename for the shared function. Client device 210 may determine that the list of filenames includes the filename for the shared function and that the list of filenames does not include the filename for the particular software component and may add the filename for the particular software component to the list of filenames. Additionally, or alternatively, client device 210 may add a shared library that includes the shared function to the list of filenames. For example, the shared function may be included in a particular shared library and/or a particular DLL. Client device 210 may determine that one or more filenames for a collection of files for the particular shared library and/or the particular DLL are not included in the list of filenames. Client device 210 may add the one or more filenames for the collection of files to the list of filenames.

In some implementations, the set of rules may include a rule for removing one or more software components from a set of dependent software components based on the target computing environment. For example, the rule may require that a software component, from the set of dependent software components, be excluded when the target computing environment is the same as the computing environment. Client device 210 may determine that the target computing environment is the same as the computing environment (e.g., the target environment and the program environment are both MATLAB®). Client device 210 may determine that a filename for the software component is included in the list of filenames and may remove the filename from the list of filenames.

In some implementations, the rule may require that each software component provided by the computing environment (e.g., each file that includes a known function) be excluded from being included in the deployable form of the application. For example, to reduce a size of the deployable form of the application and/or to protect intellectual property by minimizing a subset of the computing environment that may be deployed, the rule may require that each software component provided by and/or included in the computing environment be excluded from being included in the deployable form of the application to prevent files for functions provided by the target computing environment from being unnecessarily included in the deployable form of the application.

In some implementations, the computing environment may include one or more software components that are not included in the target computing environment. For example, the computing environment may include a standard set of software components. A provider of the computing environment may allow users to purchase additional software components for the computing environment. The rule may require that the additional software components be excluded from being included in the deployable form of the application to prevent the additional software components purchased by one user from being deployed and/or used by users who have not purchased the additional software components.

In some implementations, the rule may include an exclusion list. The exclusion list may identify one or more software components that are not to be included in a deployable form of an application. For example, for security reasons and/or to protect intellectual property, a developer of the computing environment may desire to prevent a software component, provided by the computing environment, from being deployed to other computing environments. The exclusion list may prohibit the software component from being included in the deployable form of the application.

In some implementations, client device 210 may authenticate the set of rules for modifying the set of dependent software components. For example, to prevent users from accessing the dependency database and modifying the set of rules (e.g., removing one or more software components from an exclusion list included in the set of rules), client device 210 may determine that the set of rules included in the dependency database match a stored set of rules. In some implementations, client device 210 may write an exclusion list, included in the set of rules, into a function, such as, for example, a $C^{++}$ function that encrypts the exclusion list and compares the encrypted exclusion list to another encrypted exclusion list stored in a memory (e.g., memory 330). Client device 210 may determine that the exclusion list included in the set of rules has not been modified when the encrypted exclusion list matches the other encrypted exclusion list stored in the memory.

In some implementations, client device 210 may extract a list of excluded files from the dependency database. Client device 210 may encrypt the list of excluded files and may provide the encrypted list of excluded files to an application deployment tool (e.g., a compiler, such as, for example, MATLAB Compiler). The application deployment tool may filter results of a dependency analysis against the encrypted list of excluded files to prevent files identifying in the list of excluded files from being deployed. Additionally, or alternatively, client device 210 may determine whether the set of rules has been modified using another type of security measure.

In some implementations, client device 210 may determine that the set of rules has been modified. For example, client device 210 may determine that the encrypted exclusion list does not match the other encrypted exclusion list stored in the memory. Client device 210 may cause a particular action to be taken based on the set of rules having been modified. In some implementations, the particular action may include preventing the deployable form of the application from being generated, removing every software component provided by the computing environment from the set of dependent software components determined for the application, modifying the set of dependent software components determined for application based on the encrypted exclusion list stored in the memory, and/or reverting the set of rules to their original state. Additionally, or alternatively, client device 210 may transmit information regarding the modification of the set of rules to a provider of the computing environment. The provider may receive the information and may use the information to determine whether a violation of a license agreement has occurred. In some implementations, the information may include information identifying a license associated with the user accessing, utilizing, and/or being provided the computing environment.

Process 500 may include generating a deployable form of the application (block 540). For example, client device 210 (e.g., 240) may generate an object that includes a file corresponding to each filename listed in the modified list of filenames. Client device 210 may provide the object to the user and/or deploy the object to the target computing environment. In some implementations, the object may include a frozen executable that allows the application to run in the target computing environment. The frozen executable may include an interface portion and an application portion. The interface portion may include wrapper code and/or virtual machine initialization routes that provides an interface between the application and the target environment. The application portion may include the portion of the application created by the user and/or one or more dependent software components determined for the application.

While FIG. 5 shows process 500 as including a particular quantity and arrangement of blocks, in some implementations, process 500 may include fewer blocks, additional blocks, or a different arrangement of blocks. Additionally, or alternatively, some of the blocks may be performed in parallel.

Figure 6A:
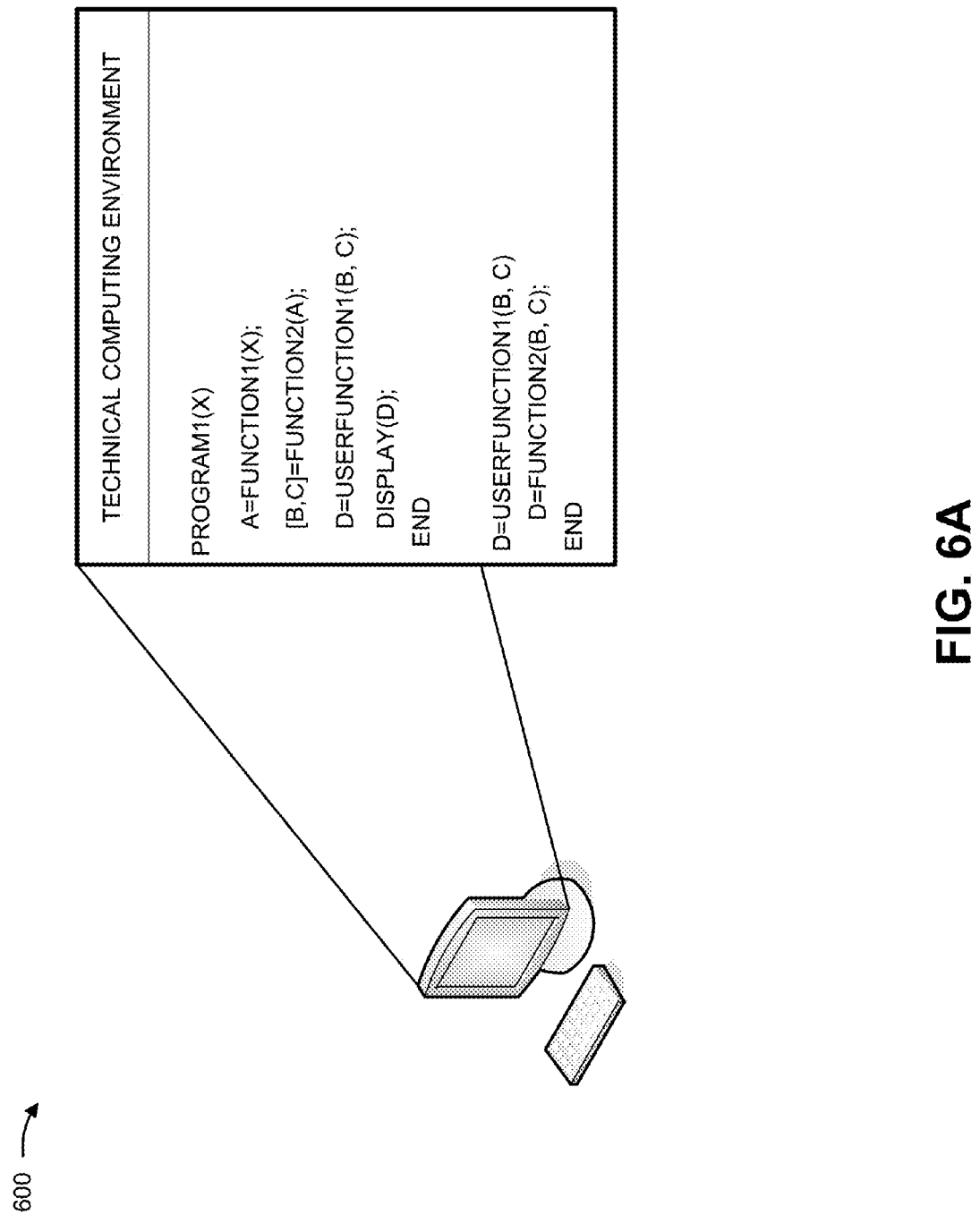
FIGS. 6A-6E are diagrams of an example of the process described in connection with FIG. 5.

FIGS. 6A-6E are diagrams of an example 600 of process 600 described in connection with FIG. 5. For example 600, assume that a user writes a computer program within TCE 240 and that the user desires to create a deployable form of the computer program so that another user can run the computer program in a target environment ("ENVIRONMENT1") that is different from TCE 240. Further, assume that TCE 240 provides a set of functions for performing various operations. As shown in FIG. 6A, PROGRAM1 invokes three functions, FUNCTION1, FUNCTION2, and USERFUNCTION1. FUNCTION1 and FUNCTION2 may correspond to functions provided by TCE 240. USERFUNCTION1 may correspond to a user-created function that is defined by a different, user-written file and is included in a deployable form of PROGRAM1.

Figure 6B:
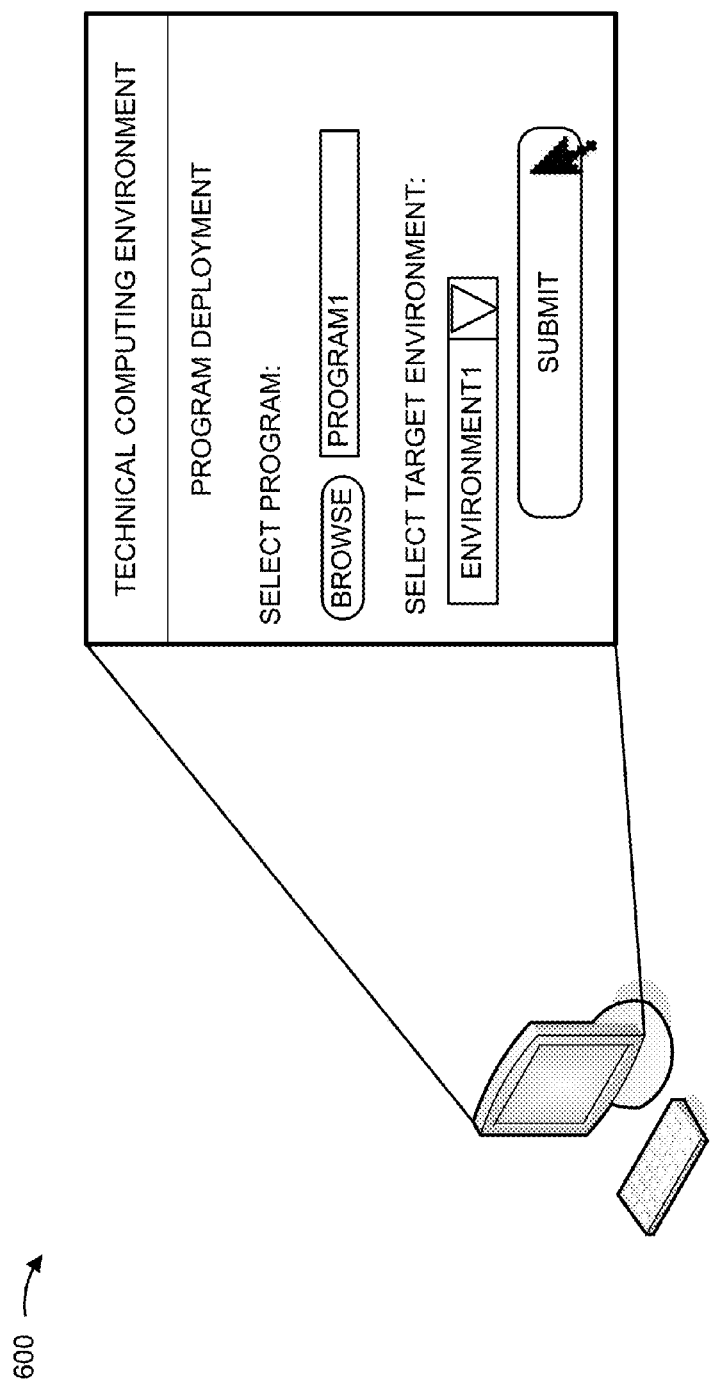

For FIG. 6B, assume that TCE 240 provides a function that allows the user to generate a deployable form of PROGRAM1 that can be run by the other user in the target environment and that, in response to the user accessing the function, TCE 240 provides a user interface associated with the function. As shown in FIG. 6B, the user provides information identifying the program into a text block provided by the user interface and selects the option "SUBMIT."

Figure 6C:
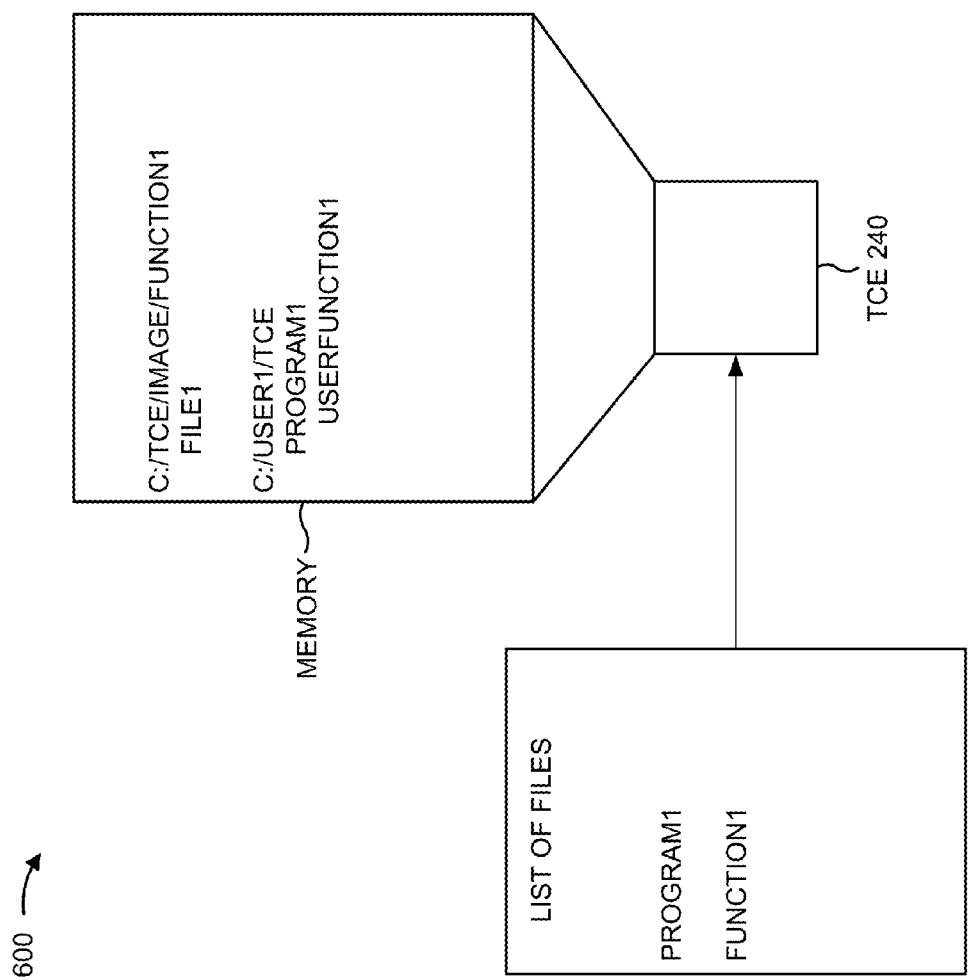

For FIG. 6C, assume that program code for implementing TCE 240 is stored under the root directory "TCE." Referring now to FIG. 6C, in response to the user selecting the SUBMIT option, TCE 240 may obtain a list of file names of files that includes the filename for PROGRAM1 and the filename for USERFUNCTION1. TCE 240 may determine that files corresponding to the filename FUNCTION1 is a known file that includes a function for which dependency information has been previously determine based on the file being stored under the root directory TCE and/or appearing in a database of files for which dependencies have been pre-computed. TCE 240 may determine that a file corresponding to the filename PROGRAM1 is an unknown file based on the file not being stored under the root directory TCE and/or that the file does not appear in a database of files for which dependencies have been pre-computed.

Figure 6D:
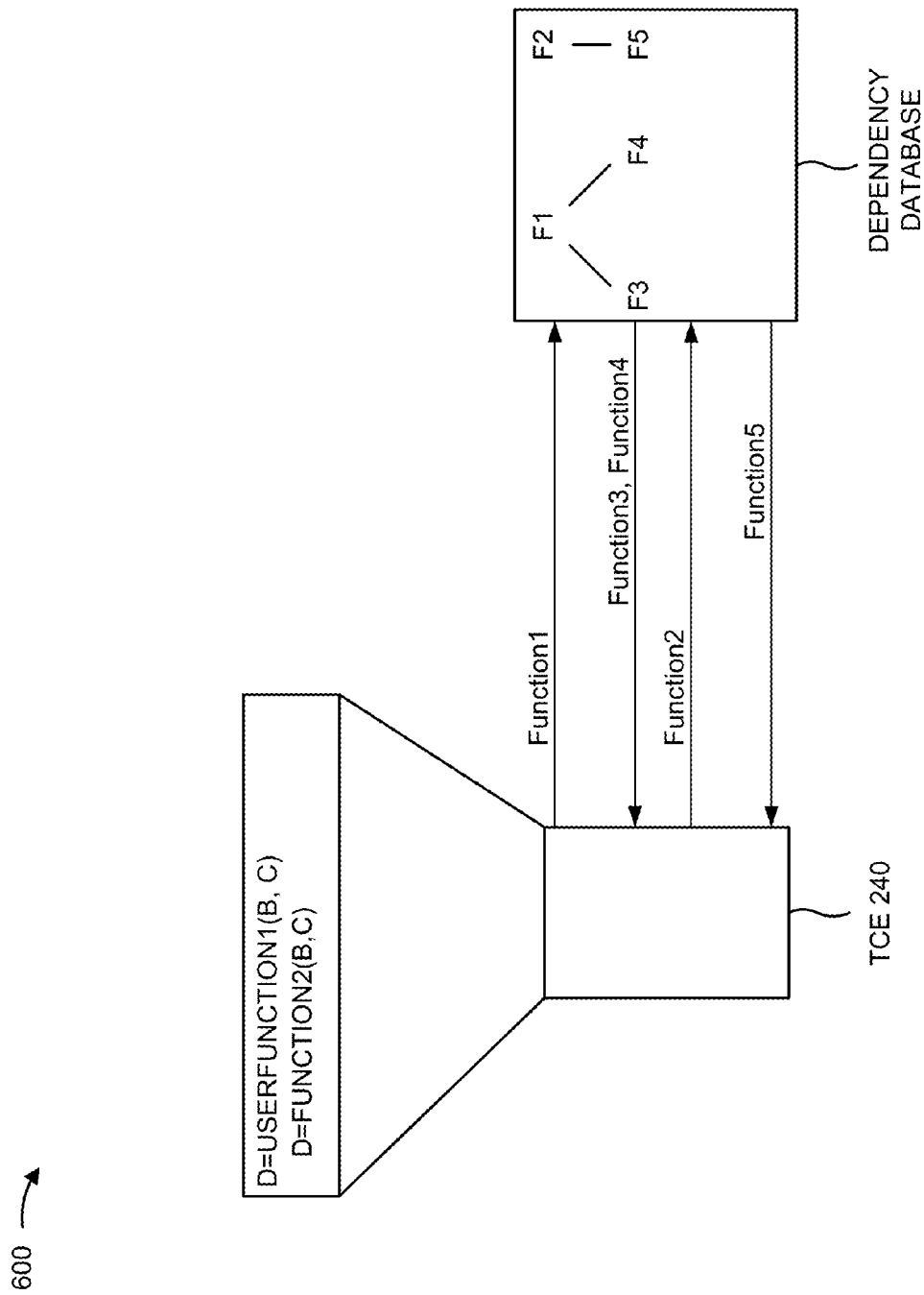

Referring now to FIG. 6D, TCE 240 may perform a look-up operation in a dependency database to determine a set of dependent functions for FUNCTION1 based on the file for FUNCTION1 being a known file. As shown in FIG. 6D, TCE 240 may identify the set of dependent functions for FUNCTION1 as including FUNCTION3 and FUNCTION4.

Based on the file for PROGRAM1 being a unknown file, TCE 240 may analyze lines of code included in the file for PROGRAM1 and may determine that PROGRAM1 invokes/calls/references USERFUNCTION1. TCE 240 may analyze lines of program code corresponding to USERFUNCTION1 and may determine that USERFUNCTION1 calls FUNCTION2. TCE 240 may determine that a file that includes FUNCTION2 is stored under the root directory TCE and/or appears in a database of files for which dependencies have been precomputed and, therefore, that FUNCTION2 is a known file. TCE 240 may perform a look-up operation in the dependency database to determine a set of dependent functions for FUNCTION2 based on FUNCTION2 being a known file. As shown in FIG. 6D, the set of dependent functions for FUNCTION2 includes FUNCTION5. For USERFUNCTION1, TCE 240 may determine a set of dependent functions that includes FUNCTION2 and FUNCTION5.

Figure 6E:
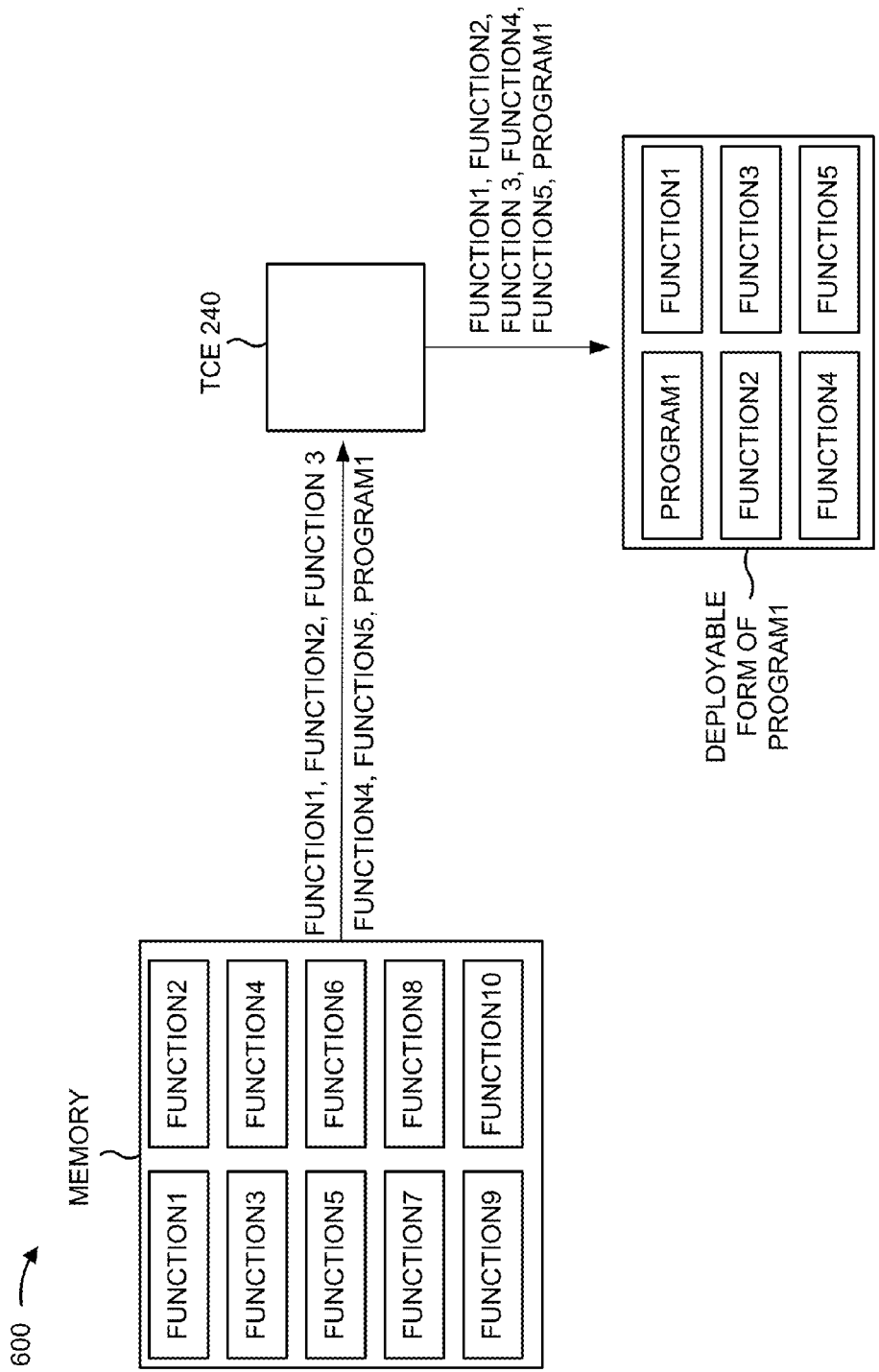

For FIG. 6E, assume that TCE 240 adds filenames for FUNCTION2, FUNCTION3, FUNCTION4, and FUNCTION5 to the list of filenames to generate an updated list of filenames. Referring now to FIG. 6E, TCE 240 may obtain files corresponding to the filenames included in the list of updated file names from a memory storing the files. TCE 240 may generate a deployable form of PROGRAM1 that includes the obtained files and allows PROGRAM1 to run in the target environment. The user may provide the deployable form of PROGRAM1 to the other user to allow the user to run PROGRAM1 in the target environment. In this way, TCE 240 is able to quickly and accurately determine dependency information for functions included in a computer program being deployed to a target computing environment.

As indicated above, FIGS. 6A-6E are provided merely as an example. Other examples are possible and may differ from what was described with regard to FIGS. 6A-6E.

The foregoing description provides illustration and description, but is not intended to be exhaustive or to limit the embodiments to the precise form disclosed. Modifications and variations are possible in light of the above teachings or may be acquired from practice of the implementations.

As used herein, the term device is intended to be broadly interpreted to refer to hardware or a combination of hardware and software, such as software executed by a processor.

It will be apparent that systems and methods, as described above, may be implemented in many different forms of software, firmware, and hardware in the implementations illustrated in the figures. The actual software code or specialized control hardware used to implement these systems and methods is not limiting of the implementations. Thus, the operation and behavior of the systems and methods were described without reference to the specific software code—it being understood that software and control hardware can be designed to implement the systems and methods based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with the phrase "one or more." Where only one item is intended, the term "one" or similar language is used. Further, the phrase "based on" is intended to mean "based, at least in part, on" unless explicitly stated otherwise.

What is claimed is:

1. A device comprising:
one or more processors to:
store dependency information for a group of software components provided by a technical computing environment,
the group of software components including a first software component and a second software component, and
the dependency information identifying the second software component as being a dependent software component of the first software component;
obtain an application generated via the technical computing environment;
determine that the application references the first software component;
access the dependency information based the application referencing the first software component;
determine that the second software component is the dependent software component of the first software component based on the dependency information;
identify a rule that excludes the second software component, which is dependent on the first software component, from being included in a deployable form of the application; and
generate, based on the rule and the second software component being the dependent software component of the first software component, the deployable form of the application that allows the application to run in another computing environment,
when generating the deployable form of the application, the one or more processors are to exclude a file containing the second software component from the deployable form of the application based on the rule.

2. The device of claim 1, where, when determining that the application references the first software component, the one or more processors are to:
perform a textual analysis of lines of code created by a user, and
determine that the application includes the first software component based on the textual analysis.

3. The device of claim 1, where, when determining that the application references the first software component, the one or more processors are to:
determine a group of symbols included in lines of code of the application,
determine that a first symbol, included in the group of symbols, corresponds to the first software component, and
determine that the application references the first software component based on the first symbol corresponding to the first software component.

4. The device of claim 3, where, when determining that the first symbol corresponds to the first software component, the one or more processors are to:
obtain a list of root directories and sub-directories,
the list identifying one or more root directories or sub-directories storing the lines of code, and
determine that the first symbol corresponds to the first software component based on the list.

5. The device of claim 1, where, when accessing the dependency information, the one or more processors are to:
determine that the dependency information has been pre-computed for the first software component, and
access the dependency information based on the dependency information for the first software component having been pre-computed.

6. The device of claim 5, where, when determining that the dependency information has been pre-computed, the one or more processors are to:
determine that a file that includes the first software component appears in a database of files for which dependencies have been pre-computed.

7. The device of claim 1, where the rule excludes the second software component from being included in the deployable form of the application based on the other computing environment, in which the deployable form of the application allows the application to run, being different than the computing environment that generated the application.

8. The device of claim 1, where the group of software components includes a third software component,
where the dependency information identifies the third software component as being another dependent software component of the first software component,
where the one or more processors are further to:
determine the third software component is the other dependent software component of the first software component based on the dependency information; and
where the one or more processors, when generating the deployable form of the application, are to:
include a file containing the third software component in the deployable form of the application based on the third software component being the other dependent software component of the first software component.

9. A method comprising:
identifying a first software component and a second software component provided by a first computing environment,
the second software component being invoked by the first software component, and
the identifying the first software component and the second software component being performed by a device;
storing dependency information for the first computing environment,
the dependency information identifying the second software component as being invoked by the first software component, and
the storing the dependency information being performed by the device;
obtaining an application generated via the first computing environment,
the obtaining the application being performed by the device;
determining that the application invokes the first software component,
the determining that the application invokes the first software component being performed by the device;

determining that dependency information has been stored for the first software component,
  the determining that the dependency information has been stored being performed by the device;
accessing the dependency information based on the dependency information having been stored,
  the accessing the dependency information being performed by the device;
obtaining a rule for preventing the second software component, which is invoked by the first software component, from being included in a deployable form of the application,
  the obtaining the rule being performed by the device;
determining that the first software component invokes the second software component based on the dependency information,
  the determining that the first software component invokes the second software component being performed by the device; and
generating a deployable form of the application based on the rule and the first software component invoking the second software component,
  the generating the deployable form of the application including excluding a file containing the second software component from the deployable form of the application based on the rule,
  the deployable form of the application allowing the application to run in a second computing environment, and
  the generating the deployable form of the application being performed by the device.

10. The method of claim 9, where determining that the first software component invokes the second software component includes:
  continually performing a dependency analysis; and
  capturing, based on continually performing the dependency analysis, one or more dependencies as the one or more dependencies are created or updated.

11. The method of claim 10, where continually performing the dependency analysis includes:
  receiving a notification of a change to one or more of the first software component or the second software component,
    the notification triggering a dependency analysis of at least one of the first software component or the second software component.

12. The method of claim 11, where continually performing the dependency analysis may pause when there are no new software components or updated software components to be analyzed.

13. The method of claim 9, where accessing the dependency information includes:
  designating a portion of the application as program code provided by the first computing environment,
  determining that the first software component is included in the portion of the application designated as program code, and
  accessing the dependency information based on the first software component being included in the portion of the application designated as program code.

14. The method of claim 13, where designating the portion of the application as program code includes:
  determining a location in a memory storing the first computing environment,
  determining that a file including the first software component is stored in the location in the memory, and
  designating the file as program code based on the file being stored in the location in the memory.

15. A non-transitory computer-readable medium storing instructions, the instructions comprising:
  one or more instructions that, when executed by one or more processors, cause the one or more processors to:
    obtain a computer program for implementing a first technical computing environment;
    determine dependency information for a group of software components provided by the first technical computing environment,
      the group of software components including a first software component and a second software component, and
      the dependency information identifying the second software component as being a dependent software component of the first software component;
    store the dependency information;
    obtain an application,
      the application being executable within the first technical computing environment;
    determine that the application invokes the first software component;
    access the dependency information based on the application invoking the first software component;
    determine that the first software component invokes the second software component based on the dependency information;
    obtain a rule that excludes the second software component, which is invoked by the first software component, from being included in a deployable form of the application; and
    generate, based on the rule and the first software component invoking the second software component, a deployable form of the application,
      when generating the deployable form of the application, the one or more instructions cause the one or more processors to exclude a file containing the second software component from the deployable form of the application based on the rule,
      the deployable form of the application being executable within a second technical computing environment.

16. The computer-readable medium of claim 15, where the one or more instructions to identify the first software component and the second software component cause the one or more processors to:
  perform a textual analysis of lines of code, and
  determine that the application includes the first software component and the second software component based on the textual analysis.

17. The computer-readable medium of claim 15, where the one or more instructions to identify the first software component and the second software component cause the one or more processors to:
  determine a group of symbols included in lines of code,
  determine that a first symbol, included in the group of symbols, corresponds to the first software component, and
  identify the first software component based on the first symbol corresponding to the first software component.

18. The computer-readable medium of claim 17, where the one or more instructions to determine the first symbol cause the one or more processors to:
  obtain a list of directories,
    the list of directories identifying one or more directories storing the lines of code, and determine that the first symbol corresponds to the first software component based on the list of directories.

19. The computer-readable medium of claim 15, where the one or more instructions to access the dependency information cause the one or more processors to:
   determine that a portion of the application is associated with the first technical computing environment,
   determine that the first software component is included in the portion of the application, and
   access the dependency information based on the first software component being included in the portion of the application.

20. The computer-readable medium of claim 19, where the one or more instruction to determine that the portion of the application is associated with the technical computing environment cause the one or more processors to:
   determine that the technical computing environment is stored under a particular directory,
   determine that a first file that includes the first software component is stored under the particular directory, and
   determine that the first software component is included in the portion of the application based on the first file being stored under the particular directory.

* * * * *

UNITED STATES PATENT AND TRADEMARK OFFICE
CERTIFICATE OF CORRECTION

| | | |
|---|---|---|
| PATENT NO. | : 9,183,120 B1 | Page 1 of 1 |
| APPLICATION NO. | : 13/910104 | |
| DATED | : November 10, 2015 | |
| INVENTOR(S) | : Peter Webb | |

It is certified that error appears in the above-identified patent and that said Letters Patent is hereby corrected as shown below:

In the claims

Column 19, line 31, after "information based" insert -- on --.

Signed and Sealed this
First Day of March, 2016

Michelle K. Lee
*Director of the United States Patent and Trademark Office*